US011161568B2

(12) United States Patent
Nakamura

(10) Patent No.: US 11,161,568 B2
(45) Date of Patent: Nov. 2, 2021

(54) REAR DERAILLEUR

(71) Applicant: Shimano Inc., Osaka (JP)

(72) Inventor: Kenta Nakamura, Osaka (JP)

(73) Assignee: Shimano Inc., Osaka (JP)

( * ) Notice: Subject to any disclaimer, the term of this patent is extended or adjusted under 35 U.S.C. 154(b) by 304 days.

(21) Appl. No.: 15/498,573

(22) Filed: Apr. 27, 2017

(65) Prior Publication Data

US 2018/0186429 A1    Jul. 5, 2018

Related U.S. Application Data

(63) Continuation-in-part of application No. 15/399,282, filed on Jan. 5, 2017, now abandoned.

(51) Int. Cl.
| | |
|---|---|
| *B62M 9/124* | (2010.01) |
| *F16H 55/30* | (2006.01) |
| *B62M 25/02* | (2006.01) |
| *B62M 9/126* | (2010.01) |
| *B62M 9/1242* | (2010.01) |
| *B62M 9/16* | (2006.01) |

(52) U.S. Cl.
CPC ............ *B62M 9/124* (2013.01); *B62M 9/126* (2013.01); *B62M 9/1242* (2013.01); *F16H 55/30* (2013.01); *B62M 9/16* (2013.01); *B62M 25/02* (2013.01)

(58) Field of Classification Search
CPC .... B62M 9/124; B62M 9/1242; B62M 9/126; B62M 9/16; B62M 9/10; F16H 55/30
See application file for complete search history.

(56) References Cited

U.S. PATENT DOCUMENTS

| | | | | |
|---|---|---|---|---|
| 3,748,916 A | * | 7/1973 | Morse ..................... | B62M 9/12 474/82 |
| 4,416,646 A | * | 11/1983 | Bergles ................ | B62M 9/1242 474/80 |
| 4,878,884 A | * | 11/1989 | Romano .............. | B62M 9/1242 474/82 |
| 5,238,458 A | * | 8/1993 | Ishibashi .............. | B62M 9/1246 474/82 |
| 7,871,346 B2 | * | 1/2011 | Takachi ................. | B62M 9/126 474/78 |
| 8,277,346 B2 | * | 10/2012 | Watarai ................. | B62M 9/126 474/82 |
| 9,272,750 B2 | | 3/2016 | Böhm | |

(Continued)

*Primary Examiner* — Michael R Mansen
*Assistant Examiner* — Robert T Reese
(74) *Attorney, Agent, or Firm* — Global IP Counselors, LLP

(57) ABSTRACT

A rear derailleur includes a base member, a movable member, a link and a chain guide. The link is connected to the base member about a first link axis and to the movable member about a second link axis. The chain guide is mounted to the movable member about a tension pivot axis. The chain guide includes a first pulley having a first rotational axis and a second pulley having a second rotational axis. The tension pivot axis is substantially parallel to the first and second rotational axes. A first reference line defines a distance between the tension pivot axis and the first rotational axis with a range between 2 to 70 millimeters. The first link axis and a reference plane define an angle ranging from 3 to 35 degrees. The first reference line and a second reference line define an angle ranging from 20 to 170 degrees.

26 Claims, 17 Drawing Sheets

(56) References Cited

U.S. PATENT DOCUMENTS

| | | | |
|---|---|---|---|
| 2005/0187050 A1* | 8/2005 | Fukuda | B62M 9/122 |
| | | | 474/80 |
| 2006/0058135 A1 | 3/2006 | Shahana | |
| 2014/0338494 A1* | 11/2014 | Sugimoto | B62M 1/36 |
| | | | 74/594.2 |
| 2015/0094178 A1* | 4/2015 | Emura | B62M 9/1242 |
| | | | 474/80 |
| 2016/0167737 A1* | 6/2016 | Tokuyama | B62M 9/10 |
| | | | 474/160 |
| 2016/0167740 A1* | 6/2016 | Zawistowski | B62M 9/122 |
| | | | 474/110 |
| 2018/0281899 A1* | 10/2018 | Bernardele | B62M 9/122 |

* cited by examiner

REAR DERAILLEUR

BACKGROUND

Field of the Invention

This invention generally relates to a rear derailleur. More specifically, the present invention relates to a rear derailleur for shifting a bicycle chain between rear sprockets.

Background Information

Generally, a bicycle typically uses a bicycle drive train for transmitting a pedaling force to a rear wheel. The drive train of a bicycle often uses one or two derailleurs to selectively move a bicycle chain from one of a plurality of sprockets to another for changing speeds of the bicycle.

SUMMARY

Generally, the present disclosure is directed to various features of a rear derailleur. In one feature presented in this disclosure, a rear derailleur is provided with a chain guide for guiding a bicycle chain.

It has been discovered that a smooth gear shift operation can be accomplished when a rear derailleur is configured and arranged to have a low profile in an axial direction with respect to a bicycle frame when the rear derailleur is mounted onto the bicycle frame.

In view of the state of the known technology and in accordance with a first aspect of the present disclosure, a bicycle derailleur is provided that basically comprises a base member, a movable member, a link member and a chain guide. The base member is configured to be mounted to a bicycle. The link member is pivotally connected to the base member about a first link axis and pivotally connected to the movable member about a second link axis. The second link axis is substantially parallel to the first link axis. The chain guide is pivotally mounted to the movable member about a tension pivot axis. The chain guide includes a first pulley and a second pulley. The first pulley has a first rotational axis. The second pulley has a second rotational axis. The first pulley is positioned closer to a rear sprocket assembly than the second pulley in a state where the bicycle rear derailleur is mounted to the bicycle. The tension pivot axis is substantially parallel to the first and second rotational axes. A first reference line defines a first distance between the tension pivot axis and the first rotational axis. The first distance has a range between 2 millimeters to 70 millimeters. The second reference line defines a second distance between the first rotational axis and the second rotational axis. The first link axis and a reference plane that defines a first angle that ranges from 3 degrees to 35 degrees. The reference plane is perpendicular to the sprocket axis. The first reference line and the second reference line define a second angle that ranges from 20 degrees to 170 degrees. Advantageously according to the first aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large. In this case, the difference in rear sprocket tooth number is preferably equal to or larger than six.

In accordance with a second aspect of the present invention, the rear derailleur according to the first aspect is configured so that the first angle ranges from 5 degrees to 30 degrees. Advantageously according to the second aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a third aspect of the present invention, the rear derailleur according to the first or second aspects is configured so that the first distance ranges from 15 mm to 60 mm. Advantageously according to the third aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a fourth aspect of the present invention, the rear derailleur according to any one of the first to third aspects is configured so that the second angle ranges from 40 degrees to 120 degrees. Advantageously according to the fourth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a fifth aspect of the present invention, the rear derailleur according to the any one of the first to fourth aspects is configured so that the first angle ranges from 5 degrees to 25 degrees. Advantageously according to the fifth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a sixth aspect of the present invention, the rear derailleur according to any one of the first to fifth aspects is configured so that the first distance ranges from 25 mm to 50 mm. Advantageously according to the sixth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a seventh aspect of the present invention, the rear derailleur according to any one of the first to sixth aspects is configured so that the second angle ranges from 60 degrees to 100 degrees. Advantageously according to the seventh aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with an eighth aspect of the present invention, a bicycle drive train having the rear derailleur according to any one of the first to seventh aspects is provided having at least one at least one front sprocket, at least one rear sprocket, and a bicycle chain. The bicycle chain selectively engages with the at least one front sprocket and the at least one rear sprocket. Advantageously according to the eighth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a ninth aspect of the present invention, the bicycle drive train according to the eighth aspect is configured so that the at least one front sprocket includes a sprocket body and a plurality of sprocket teeth. The plurality of sprocket teeth extend radially outwardly from an outer periphery of the sprocket body. The plurality of sprocket teeth includes at least one first tooth and at least one second tooth. The at least one first tooth has a first maximum chain-engaging width. The at least one second tooth has a second maximum chain-engaging width that is smaller than the first maximum chain-engaging width. Advantageously according to the ninth aspect of the present invention, it is possible to improve chain engagement of the front sprocket.

In accordance with a tenth aspect of the present invention, the bicycle sprocket according to the ninth aspect is configured so that the first maximum chain-engaging width is larger than an inner link space. The inner link space is defined between an opposed pair of inner link plates of a bicycle chain in an axial direction parallel to a rotational center axis of the bicycle sprocket. The first maximum chain-engaging width is smaller than an outer link space. The outer link space is defined between an opposed pair of outer link plates of the bicycle chain in the axial direction. The second maximum chain-engaging width is smaller than the inner link space. Advantageously according to the tenth aspect of the present invention, it is possible to improve chain engagement of the front sprocket.

In accordance with an eleventh aspect of the present invention, the bicycle drive train according to any one of the eighth to tenth aspects is configured so that the at least one rear sprocket includes a first sprocket and a second sprocket. The first sprocket has a first tooth number that is more than or equal to forty-four. The second sprocket has a second tooth number that is less than or equal to ten. Advantageously according to the eleventh aspect of the present invention, it is possible to provide a bicycle drive train having a rear sprocket assembly that has a wide gear ratio.

In accordance with a twelfth aspect of the present invention, the bicycle drive train according to the eleventh aspect is configured so that the second tooth number is more than or equal to fifty. Advantageously according to the twelfth aspect of the present invention, it is possible to provide a bicycle drive train having a rear sprocket assembly that has a wide gear ratio.

In accordance with a thirteenth aspect of the present invention, the bicycle drive train according to any one of the eleventh and twelfth aspects is configured so that the at least one front sprocket consists of a solitary front sprocket. Advantageously according to the thirteenth aspect of the present invention, it is possible to reduce the total weight of the bicycle drive train.

In accordance with a fourteenth aspect of the present invention, a rear derailleur is provided that basically comprises a base member, a movable member, a link member and a chain guide. The base member is configured to be mounted to a bicycle. The link member is pivotally connected to the base member about a first link axis and pivotally connected to the movable member about a second link axis. The second link axis is substantially parallel to the first link axis. The chain guide is pivotally mounted to the movable member about a tension pivot axis. The chain guide includes a first pulley and a second pulley. The first pulley has a first rotational axis. The second pulley has a second rotational axis. The first pulley is positioned closer to a rear sprocket assembly than the second pulley in a state where the bicycle rear derailleur is mounted to the bicycle. The tension pivot axis is substantially parallel to the first and second rotational axes. A first reference line defines a first distance between the tension pivot axis and the first rotational axis. The first distance has a range between 20 millimeters to 70 millimeters. The second reference line defines a second distance between the first rotational axis and the second rotational axis. The first link axis and a reference plane that defines a first angle that ranges from 3 degrees to 60 degrees. The reference plane is perpendicular to the sprocket axis. The first reference line and the second reference line define a second angle that ranges from 20 degrees to 170 degrees. Advantageously according to the fourteenth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large. In this case, the difference in rear sprocket tooth number is preferably equal to or larger than six.

In accordance with a fifteenth aspect of the present invention, the rear derailleur according to the fourteenth aspect is configured so that the first angle ranges from 5 degrees to 30 degrees. Advantageously according to the fifteenth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a sixteenth aspect of the present invention, the rear derailleur according to any one of the fourteenth to fifteenth aspects is configured so that the first distance ranges from 20 mm to 60 mm. Advantageously according to the sixteenth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a seventeenth aspect of the present invention, the rear derailleur according to any one of the fourteenth to sixteenth aspects is configured so that the second angle ranges from 40 degrees to 120 degrees. Advantageously according to the seventeenth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with an eighteenth aspect of the present invention, the rear derailleur according to any one of the fourteenth to seventeenth aspects is configured so that the first angle ranges from 5 degrees to 25 degrees. Advantageously according to the eighteenth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a nineteenth aspect of the present invention, the rear derailleur according to any one of the fourteenth to eighteenth aspects is configured so that the first distance ranges from 25 mm to 50 mm. Advantageously according to the nineteenth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a twentieth aspect of the present invention, the rear derailleur according to any one of the fourteenth to nineteenth aspects is configured so that the second angle ranges from 60 degrees to 100 degrees. Advantageously according to the twentieth aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a twenty-first aspect of the present invention, a bicycle drive train including the rear derailleur according to any one of the fourteenth to twentieth aspects is configured to further comprise at least one front sprocket, at least one rear sprocket, and a bicycle chain. The bicycle chain selectively engages with the at least one front sprocket and the at least one rear sprocket. Advantageously according to the twenty-first aspect of the present invention, the rear derailleur is configured to have a low profile in an axial direction of a bicycle frame when the rear derailleur is mounted to the bicycle frame such that it is possible to achieve a smooth shifting operation when a difference in rear sprocket tooth number between a small sprocket and a large sprocket adjacent to the small sprocket is large.

In accordance with a twenty-second aspect of the present invention, the bicycle drive train according to the twenty-first is configured so that the at least one front sprocket includes a sprocket body and a plurality of sprocket teeth. The plurality of sprocket teeth extends radially outwardly from an outer periphery of the sprocket body. The plurality of sprocket teeth includes at least one first tooth and at least one second tooth. The at least one first tooth has a first maximum chain-engaging width. The at least one second tooth has a second maximum chain-engaging width that is smaller than the first maximum chain-engaging width. Advantageously according to the twenty-second aspect of the present invention, it is possible to improve chain engagement of the front sprocket.

In accordance with a twenty-third aspect of the present invention, the bicycle sprocket according to the twenty-second aspect is configured so that the first maximum chain-engaging width is larger than an inner link space. The inner link space is defined between an opposed pair of inner link plates of a bicycle chain in an axial direction parallel to a rotational center axis of the bicycle sprocket. The first maximum chain-engaging width is smaller than an outer link space. The outer link space is defined between an opposed pair of outer link plates of the bicycle chain in the axial direction. The second maximum chain-engaging width is smaller than the inner link space. Advantageously according to the twenty-third aspect of the present invention, it is possible to improve chain engagement of the front sprocket.

In accordance with a twenty-fourth aspect of the present invention, the bicycle drive train according to any one of the twenty-first to the twenty-third aspects is configured so that the at least one rear sprocket includes a first sprocket and a second sprocket. The first sprocket having a first tooth number that is more than or equal to forty-four. The second sprocket having a second tooth number that is less than or equal to ten. Advantageously according to any one of the twenty-fourth aspect of the present invention, it is possible to provide a bicycle drive train having a rear sprocket assembly that has a wide gear ratio.

In accordance with a twenty-fifth aspect of the present invention, the rear derailleur according to the twenty-fourth aspect is configured so that the second tooth number is more than or equal to fifty. Advantageously according to any one of the twenty-fifth aspect of the present invention, it is possible to provide a bicycle drive train having a rear sprocket assembly that has a wide gear ratio.

In accordance with a twenty-sixth aspect of the present invention, the rear derailleur according to any one of the twenty-fourth and twenty-fifth aspects is configured so that the at least one front sprocket consists of a solitary front sprocket. Advantageously according to the twenty-sixth aspect of the present invention, it is possible to reduce the total weight of the bicycle drive train.

Also other objects, features, aspects and advantages of the disclosed rear derailleur will become apparent to those skilled in the art from the following detailed description, which, taken in conjunction with the annexed drawings, discloses one embodiment of the rear derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
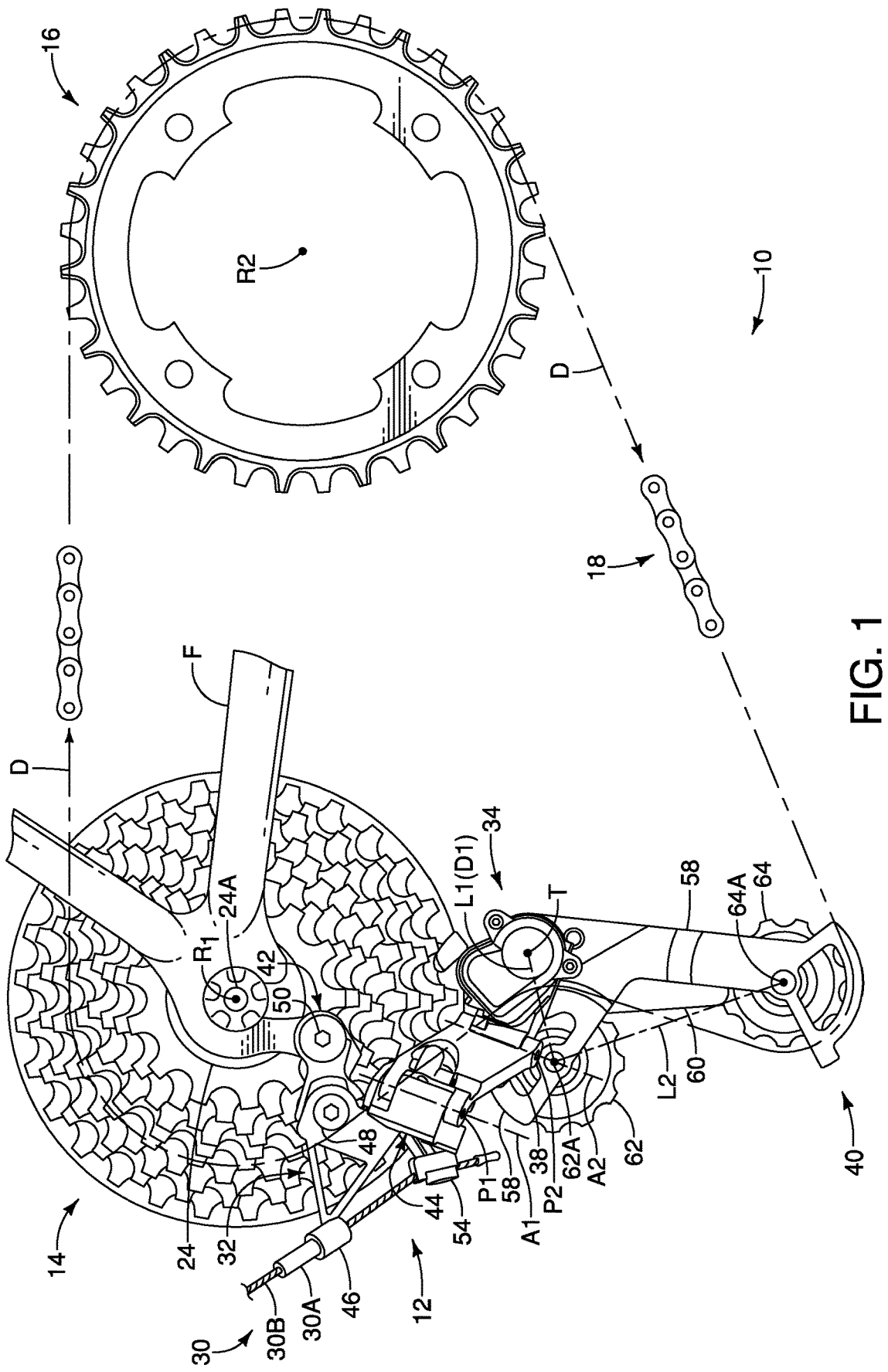
FIG. 1 is a side elevational view of a bicycle drive train having a front sprocket, a rear sprocket assembly and a rear derailleur in accordance with a first illustrated embodiment.

Referring initially to FIG. 1, a bicycle drive train 10 is illustrated with a bicycle rear derailleur 12 that is mounted to a portion of a bicycle frame F. The drive train 10 also includes at least one rear sprocket 14, at least one front sprocket 16 and a bicycle chain 18. The bicycle chain 18 is selectively engaged with the at least one front sprocket 16 and the at least one rear sprocket 14 in a conventional manner. In the illustrated embodiment, the drive train 10 preferably has a plurality of the rear sprockets 14 that form a rear sprocket assembly. In the illustrated embodiment, the at least one front sprocket 16 consists of a solitary front sprocket. The bicycle chain 18 extends from the front sprocket 16 to one of the rear sprockets 14 in a chain running direction D in a conventional manner. The bicycle chain 18 is illustrated as a roller chain having a plurality of inner and outer links 20 and 22 that alternate in the chain running direction D. The bicycle chain 18 is configured to meshingly engage with the teeth of the front sprocket 16 and the rear sprockets 14, as will be further discussed below.

The rear derailleur 12 is configured to shift the bicycle chain 18 between the rear sprockets 14 of the rear sprocket assembly, as will be further discussed below. The rear sprockets 14 are mounted on a freewheel (not shown) of a rear hub 24 in a conventional manner to transmit drive torque to the rear wheel (not shown). The rear sprockets 14 are arranged coaxial with a first sprocket axis R1 of a rear hub axle 24A. The rear sprockets 14 are part of a conventional rear sprocket assembly, and thus, the rear sprockets 14 will not be further discussed in detail herein. Various alternatives of the rear sprockets 14 that can be utilized with the rear derailleur 12 will be further discussed below.

Figure 7:
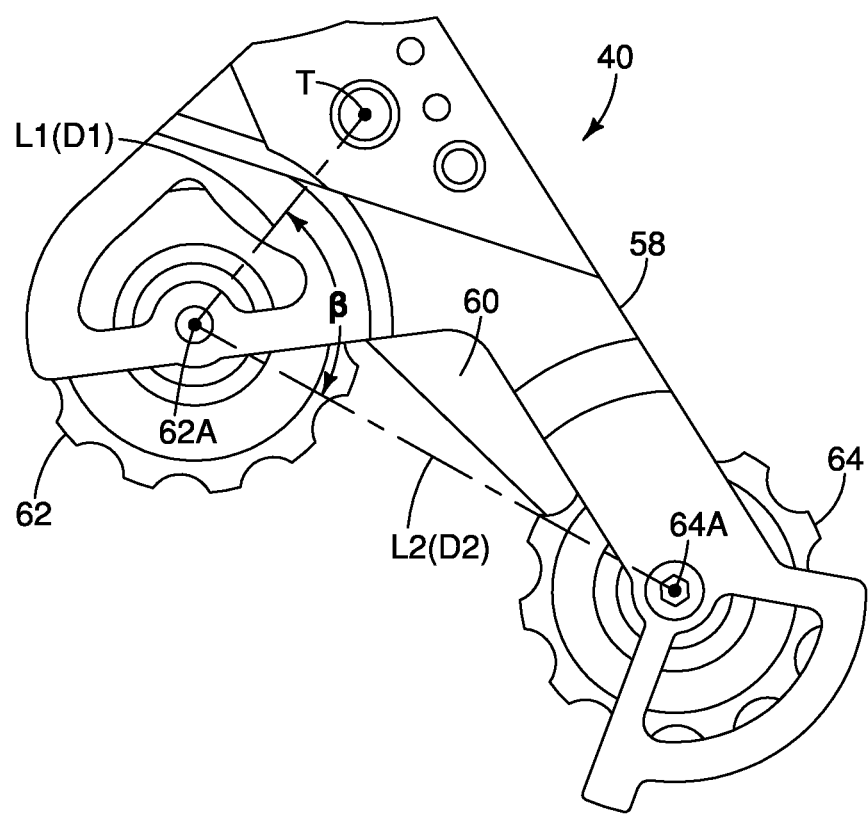
FIG. 7 is an outside elevational view of the chain guide of the rear derailleur illustrated in FIGS. 1 to 6.

The front sprocket 16 is configured to be attached to a crank arm (not shown) in a conventional manner and to transmit drive torque to the rear wheel (not shown) via the bicycle chain 18 and the at least one rear sprocket 14. As best seen in FIG. 7, in the illustrated embodiment, the front sprocket 16 has at least one first tooth 26 and at least one second tooth 28. The front sprocket 16 will be further discussed below. The front sprocket 16 is arranged coaxial with a second sprocket axis R2.

The rear derailleur 12 will now be discussed with reference to FIGS. 1 to 7. The rear derailleur 12 is operatively coupled to a rear shifter (not shown) via a control cable 30 in a conventional manner. The control cable 30 is preferably a conventional Bowden type cable having a protective outer casing 30A and an inner wire 30B. The bicycle rear derailleur 12 comprises a base member 32, a movable member 34, a link member 38 and a chain guide 40. As best seen in FIGS. 5 and 6, the bicycle rear derailleur 12 further comprises another link member 41. The link members 38 and 41 form a linkage assembly in which the link member 38 is an outer link and the link member 41 is an inner link. The movable member 34, the link members 38 and 41 and the chain guide 40 are configured to pivot relative to the base member 32 to shift the bicycle chain 18 between the rear sprockets 14. In particular, the chain guide 40 is configured to pivot about a tension pivot axis T, as will be further discussed below.

In the illustrated embodiment, the rear derailleur 12 is a single tension type rear derailleur 12. That is, the chain guide 40 is the only tension applying member of the rear derailleur 12 that applies tension to the bicycle chain 18 during use. However, it will be apparent to those skilled in the art from this disclosure that the rear derailleur 12 can be configured as a double tension type derailleur. A double tension type derailleur includes an additional force applying member to the chain guide 40 that is installed inside the base member 32 in order to apply tension to the bicycle chain 18 during use.

The base member 32 is configured to be mounted to the bicycle frame F. In particular, the base member 32 is configured to be releasably mounted to the bicycle frame F. The base member 32 is a rigid member made of a suitable material such as a metallic material or a fiber reinforced plastic material. Basically, the base member 32 includes a bracket axle unit 42, a main body portion 44 and an outer casing support portion 46. The bracket axle unit 42 pivotally supports the main body portion 44 and the outer casing support portion 46 at a B-axle 48. The bracket axle unit 42 is fixed to a hanger portion of the bicycle frame F via a fixing bolt 50. The main body portion 44 is configured and arranged to be pivotally mounted to the bracket axle unit 42 for limited pivotal movement relative thereto. The outer casing support portion 46 supports one end of the outer casing 30A of the control cable 30. The bracket axle unit 42 is a stationary (non-movable) member relative to the bicycle frame F.

As best seen in FIGS. 3 to 6, the link member 38 is pivotally attached to the base member 32 by a first pivot pin P1 that defines a first link axis A1. A second end of the link member 38 is pivotally attached to the movable member 34 by a second pivot pin P2 that defines a second link axis A2. In other words, the link member 38 is pivotally connected to the base member 32 about the first link axis A1. The link member 38 is pivotally connected to the movable member 34 about the second link axis A2. As shown, the second link axis A2 is substantially parallel to the first link axis A1. The link member 41 includes an inner wire attachment bolt 54 for attaching the inner wire 30B of the control cable 30 thereto. A first end of the link member 41 is pivotally attached to the base member 32 by a third pivot pin P3, and a second end of the link member 41 is pivotally attached to the movable member 34 by a fourth pivot pin P4. Thus, the base member 32, the movable member 34, the link member 41 and the link member 38 form a four-bar linkage arranged to move the chain guide 40 laterally between a plurality of shift positions (e.g., a first position and a second position) in a conventional manner.

Figure 2:
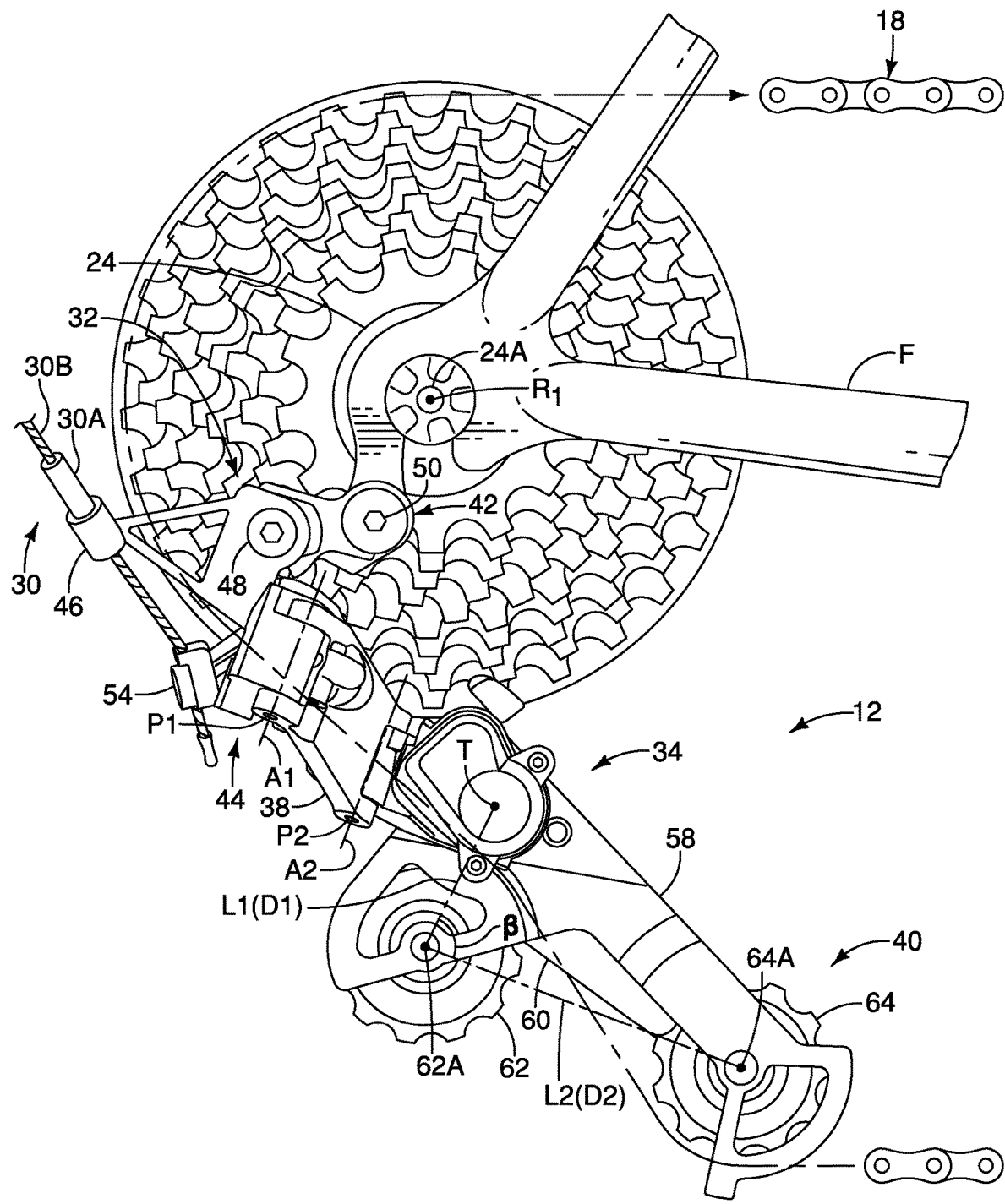
FIG. 2 is an outer side elevational view of the rear sprocket assembly and the rear derailleur illustrated in FIG. 1, with the rear derailleur in a low position.
Figure 3:
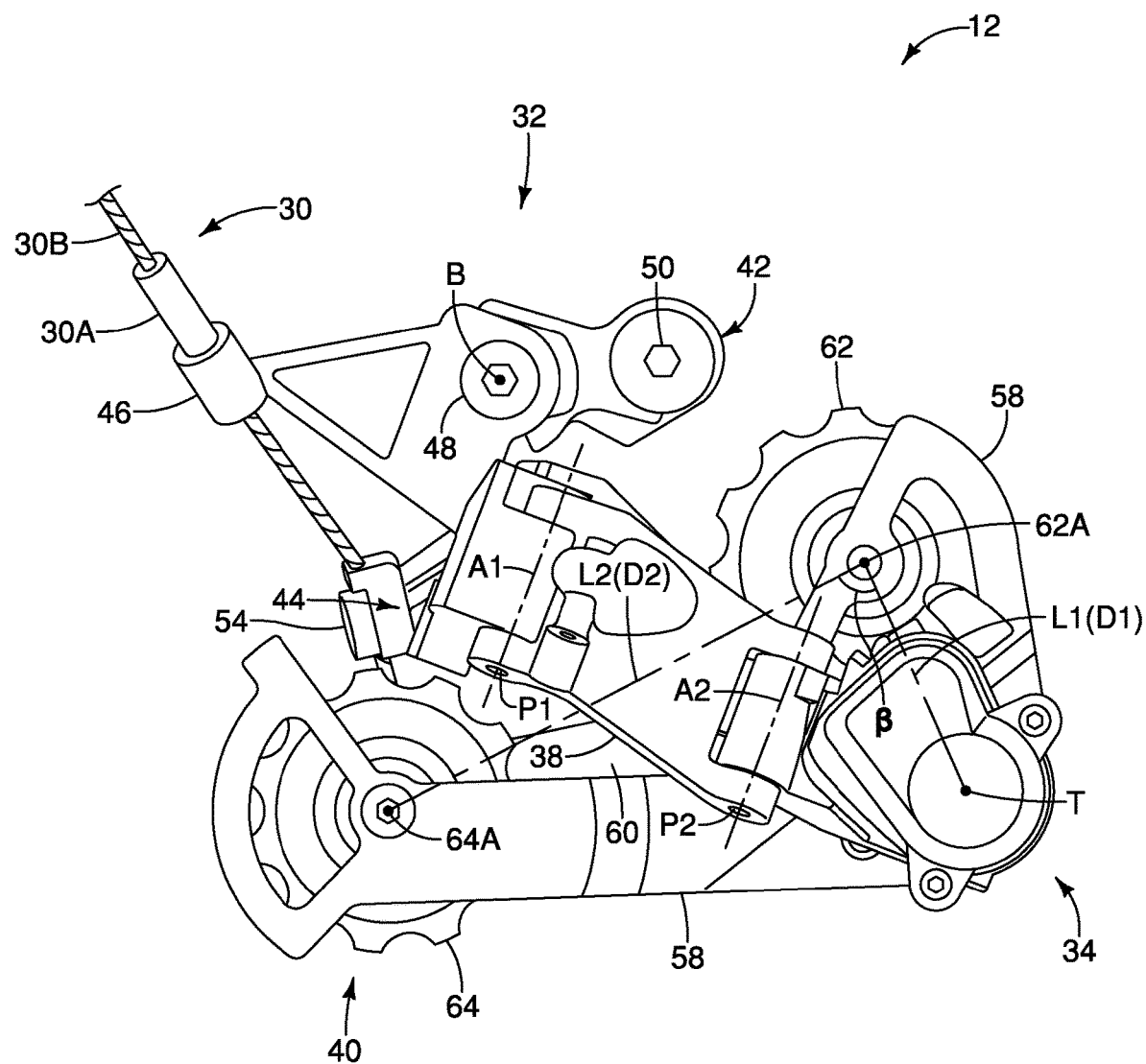
FIG. 3 is an outer side elevational view of the rear derailleur illustrated in FIGS. 1 and 2 in the top position.
Figure 4:
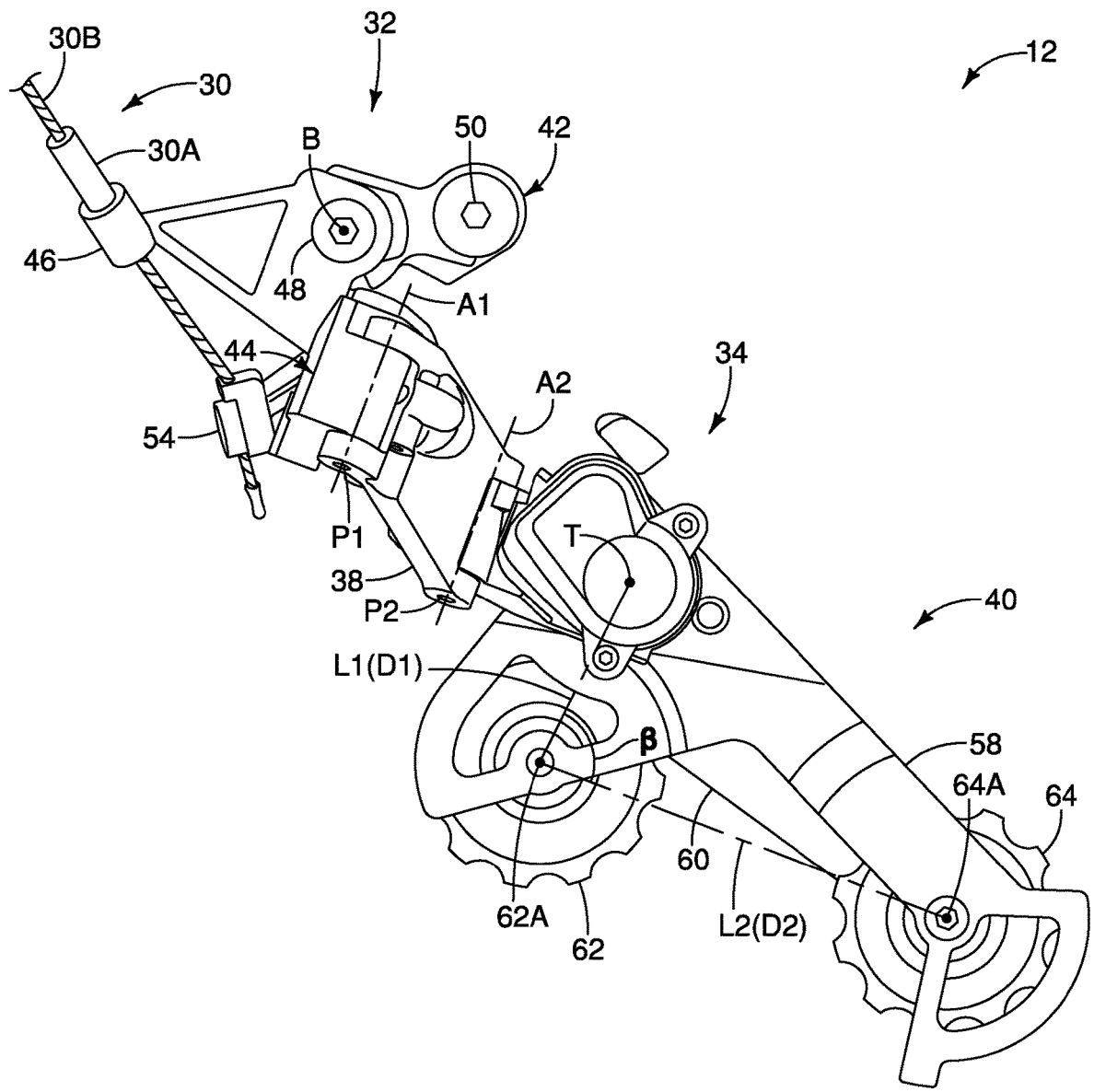
FIG. 4 is an outer side elevational view of the rear derailleur illustrated in FIGS. 1 to 3 in the low position.
Figure 5:
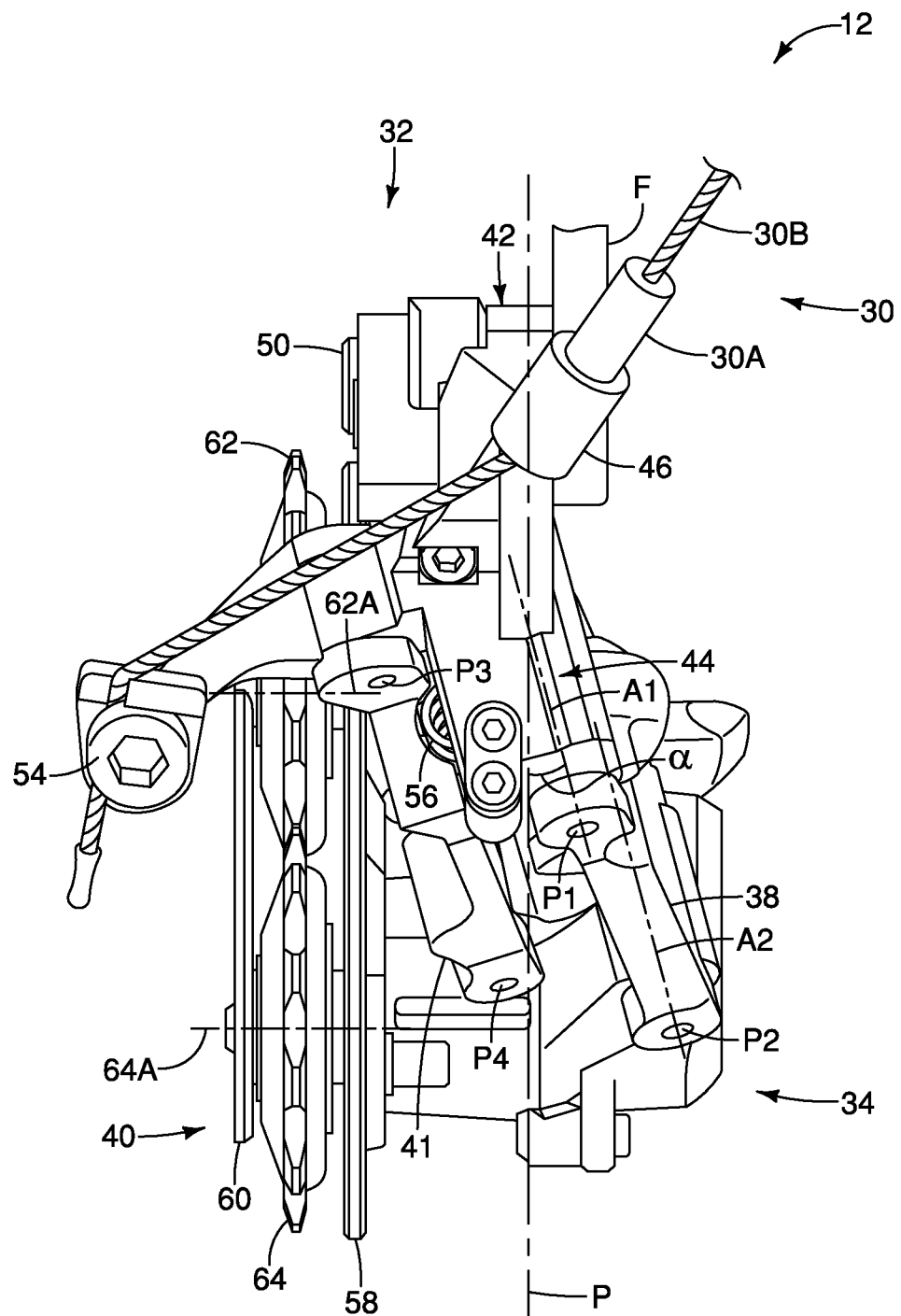
FIG. 5 is a rear elevational view of the rear derailleur illustrated in FIGS. 1 to 4 in the top position.
Figure 6:
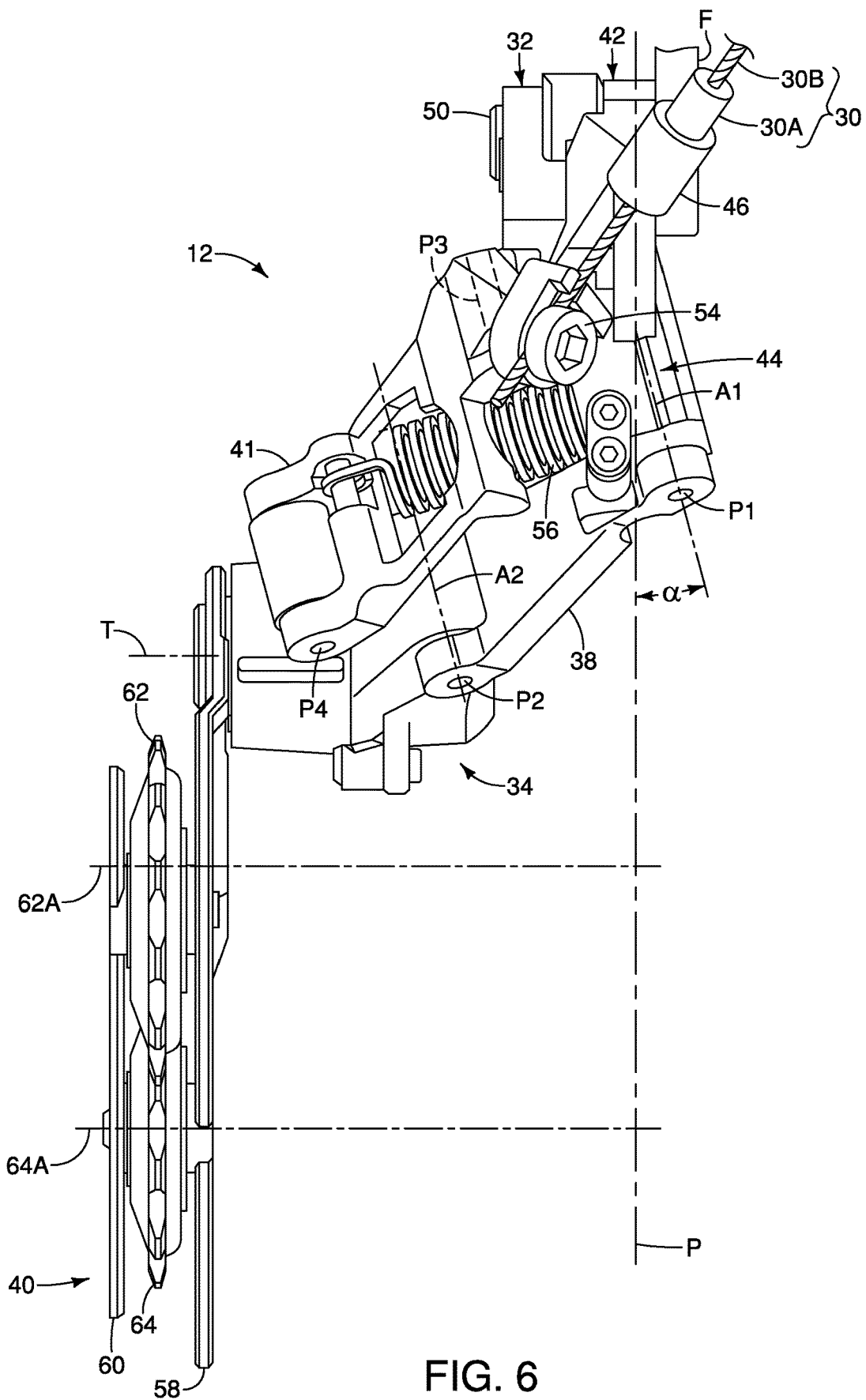
FIG. 6 is a rear elevational view of the rear derailleur illustrated in FIGS. 1 to 5 in the low position.

As best seen in FIGS. 5 and 6, the linkage assembly further includes a biasing member 56 that is interposed between the link member 41 and the link member 38 to bias the movable member 34 towards one of a top shift stage position (FIGS. 3 and 5) and a low shift stage position (FIGS. 2, 4 and 6). In the first embodiment, the biasing member 56 is a coil tension spring that biases the movable member 34 towards the top shift stage position. As used herein, the term "top shift stage (gear) position" refers to the rear derailleur 12 being in an operating position that corresponds to the chain 18 being guided onto the one of the rear sprockets 14 with the smallest number of teeth. As used herein, the term "low shift stage (gear) position" refers to the rear derailleur 12 being in an operating position that corresponds to the chain 18 being guided onto the one of the rear sprockets 14 with the largest number of teeth.

The movable member 34 movably connects the link members 38 and 41 and the chain guide 40 so that the chain guide 40 can pivot about the tension pivot axis T. The movable member 34 is a rigid member made of a suitable material such as a metallic material or a fiber reinforced plastic material. The movable member 34 functions in a conventional manner and will not be further discussed herein.

The chain guide 40 is pivotally mounted to the movable member 34 about the tension pivot axis T. In this way, the chain guide 40 pivots relative to the movable member 34. The chain guide 40 cooperates with the movable member 34 to create tension in the bicycle chain 18 as the rear derailleur 12 moves parallel to the first sprocket axis R1 during a shifting operation. The chain guide 40 basically includes a first or outer chain cage plate 58, a second or inner chain cage plate 60, a first or guide pulley 62 and a second or tension pulley 64. The chain cage plates 58 and 60 define a chain receiving slot for receiving the bicycle chain 18. The first and second pulleys 62 and 64 are both rotatably disposed between the chain cage plates 58 and 60. The first pulley 62 has a first rotational axis 62A. The second pulley 64 has a second rotational axis 64A. The tension pivot axis T is substantially parallel to the first and second rotational axes 62A and 64A.

The first pulley 62 is positioned closer to the rear sprocket assembly of the rear sprockets 14 than the second pulley 64 in a state where the rear derailleur 12 is mounted to the bicycle frame F. The chain guide 40 is pivotally mounted to the movable member 34 about the tension pivot axis T in a conventional manner with a torsion spring (not shown) interposed therebetween. The first and second pulleys 62 and 64 rotate about the first and second rotational axes 62A and 64A, respectively, which are parallel to one another.

As best seen in FIGS. 5 and 6, the rear derailleur 12 is mounted to the bicycle frame F such that the rear derailleur 12 moves in a direction perpendicular to a first reference plane P that is perpendicular to the first sprocket axis R1. As seen in FIGS. 2 to 4, the first and second pulleys 62 and 64 are mounted to the chain guide 40 to define a first reference line L1 and a second reference line L2. The first reference line L1 defines a first distance D1 between the tension pivot axis T and the first rotational axis 62A. The second reference line L2 defines a second distance D2 between the first rotational axis 62A and the second rotational axis 64A.

In the illustrated embodiment, the first distance D1 has a range of 2 millimeters to 70 millimeters. Preferably, the first distance D1 can range from 15 millimeters to 60 millimeters. More preferably, the first distance D1 can range from 20 millimeters to 60 millimeters. Even more preferably, the first distance D1 ranges from 25 mm to 50 mm. More preferably, the first distance D1 is 37 millimeters. Alternatively, in the illustrated embodiment, the first distance D1 has a range of 20 millimeters to 70 millimeters. Preferably, the first distance D1 can range from 20 millimeters to 60 millimeters. More preferably, the first distance D1 ranges from 25 mm to 50 mm. Even more preferably, the first distance D1 is 37 millimeters as shown in FIG. 7.

In the illustrated embodiment, as best seen in FIGS. 5 and 6, the first link axis A1 and the first reference plane P define a first angle α. The first angle α includes a range from 3 degrees to 60 degrees. Alternatively, the first angle α can range from 3 degrees to 35 degrees. Preferably, the first angle α ranges from 5 degrees to 30 degrees. More preferably, the first angle α ranges from 5 degrees to 25 degrees. Even more preferably, the first angle α is 14 degrees as shown in FIG. 6.

As seen in FIGS. 2 to 4, the first reference line L1 and the second reference line L2 define a second angle ß ranging from 20 degrees to 170 degrees. Preferably, the second angle ß ranges from 40 degrees to 120 degrees. More preferably, the second angle ß ranges from 60 degrees to 100 degrees. Even more preferably, the second angle ß is 80 degrees as shown in FIG. 7.

Given this configuration and arrangement of the rear derailleur 12, the rear derailleur 12 can have a low profile in an axial direction with respect to the bicycle frame F. That is, a distance that the rear derailleur 12 extends from the bicycle frame F in a lateral direction is reduced. As a result, it is possible to achieve a smooth shifting operation between the rear sprockets 14 when a tooth number difference between a small sprocket and a large sprocket adjacent to the small sprocket is large. In this case, the difference in rear sprocket tooth number is preferably equal to or larger than six.

Figure 8:
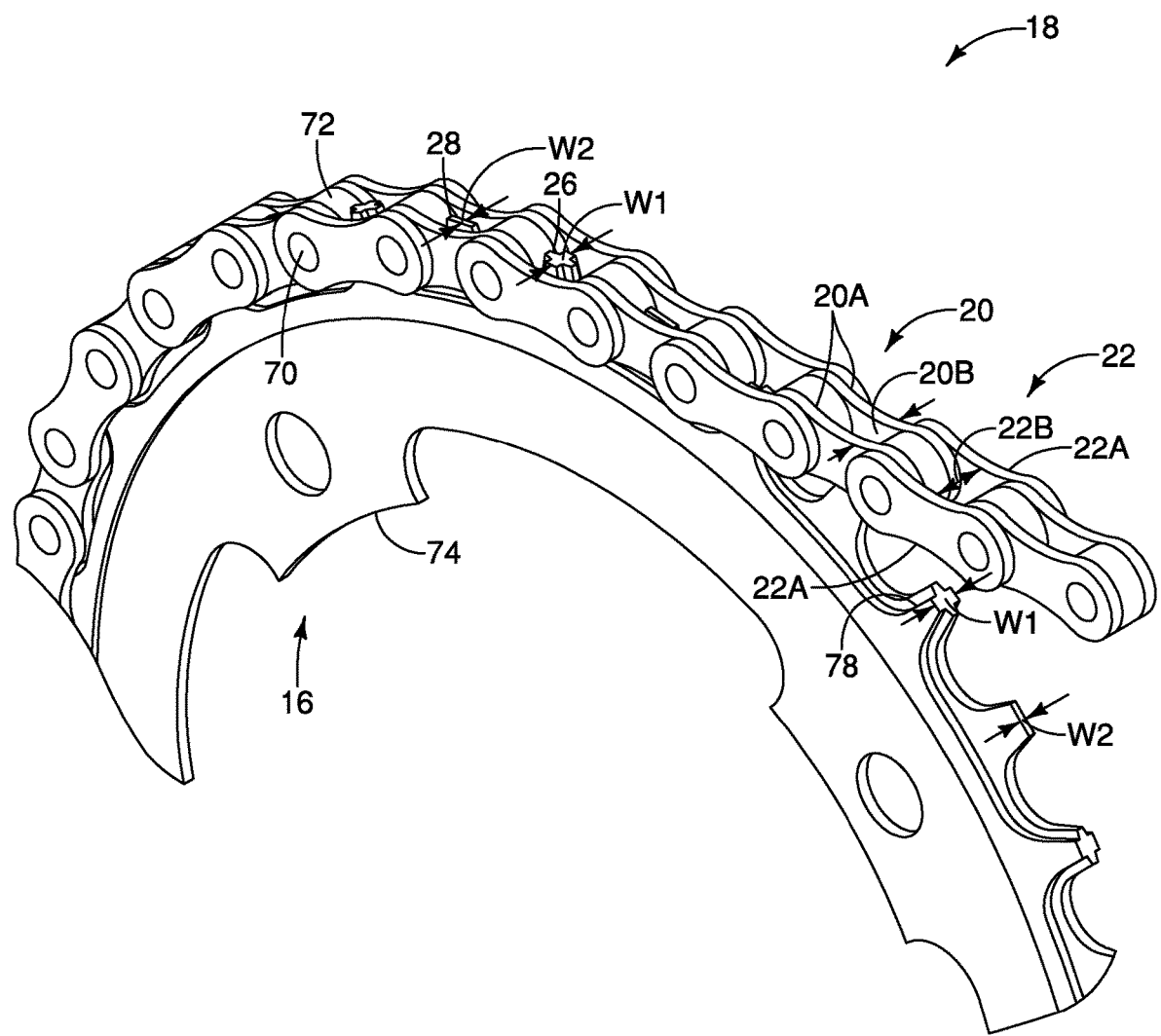
FIG. 8 is enlarged perspective view of a portion of the front sprocket illustrated in FIG. 1 having alternating wide and narrow teeth.

The bicycle chain 18 will now be discussed with reference to FIG. 8. The bicycle chain 18 has a plurality of inner links 20 and a plurality of outer links 22 that are interconnected in an alternating manner by a plurality of pins 70. Typically, each of the inner links 20 includes a pair of parallel inner link plates 20A separated by an inner link space 20B. Thus, the inner link space 20B is defined between an opposed pair of the inner link plates 20A of the bicycle chain 18 in an axial direction parallel to a rotational center axis of the bicycle sprocket 14 (i.e., the first and second sprocket axes R1 and R2).

Each of the outer links 22 includes a pair of parallel outer link plates 22A separated by an outer link space 22B. Thus, the outer link space 22B is defined between an opposed pair of the outer link plates 22A of the bicycle chain 18 in the axial direction. Preferably, each of the pins 70 has a roller 72 that is rotatably disposed thereon. Thus, the bicycle chain 18 is a conventional bicycle chain 18 and will not be further discussed in detail herein.

The front sprocket 16 will now be discussed. The front sprocket 16 includes a sprocket body 74 and a plurality of front sprocket teeth (the first and second teeth 26 and 28). As stated above, the front sprocket 16 is a solitary front sprocket 16 having a plurality of alternating wide and narrow teeth. Thus, an upshift or downshift operation is done via the rear derailleur moving the chain 18 between the rear sprockets 14. Alternatively, the front sprocket 16 can be a front sprocket assembly having multiple front sprockets in which the teeth can have a uniform width or alternating wide and narrow widths.

Preferably, the first and second teeth 26 and 28 are made of a metallic material that is preferably aluminum, titanium, stainless steel, magnesium, beryllium or other suitable metallic materials. The sprocket body 74 and the first and second teeth 26 and 28 can be both made of a metallic material, and can be formed integrally as a one-piece, unitary member. If weight saving is needed and/or desired, the sprocket body 74 can include a non-metallic material such as preferably a fiber-reinforced resin material while the teeth can include a metallic material. The sprocket body 74 has a rotational axis that corresponds to the second sprocket axis R2.

The front sprocket teeth (i.e., the first and second teeth 26 and 28) extend radially outwardly from an outer periphery of the sprocket body 74. In particular, the first teeth 26 and the second teeth 28 are illustrated in an alternating sequence along the outer periphery of the sprocket body 74. The first teeth 26 are preferably formed into a "+" (plus) shape as seen from the radially outer side, as shown in FIG. 7. The second teeth 28 are preferably formed into a "−" (minus) shape as seen from the radially outer side. The first teeth 26 and the second teeth 28 taper so as to gradually decrease in axial width toward the radially outer side. The first teeth 26 and the second teeth 28 thereby engage more readily with the outer link plates 22A and the inner link plates 20A. In the first embodiment, the first teeth 26 are identical to the second teeth 28 in terms of height in the radial direction from the second sprocket axis.

The front sprocket 16 includes a pair of projecting members 78 that extend into each of the first teeth 26 such that each first tooth 26 defines a maximum chain engaging width W1 for engaging with the outer link 22 of the bicycle chain 18. Thus, the at least one first tooth 26 has the first maximum chain-engaging width W1. The at least one second tooth 28 defines a second chain engaging tooth width W2 for engaging with the inner link 20 of the bicycle chain 18. Thus, the at least one second tooth 28 has the second maximum chain-engaging width W2. Due to the projecting members 78, the first chain engaging tooth width W1 is greater than the second chain engaging tooth width W2. As a result, the first maximum chain-engaging width W1 is larger than the inner link space 20B but is smaller than the outer link space 22B. In other words, the first teeth 26 are sized to engage the outer links 22 of the bicycle chain 18. The second maximum chain-engaging width W2 is smaller than the first maximum chain-engaging width W1 and is smaller than the inner link space 20B. In other words, the second teeth 28 are sized to engage the inner links 20 of the bicycle chain 18.

Figure 9:
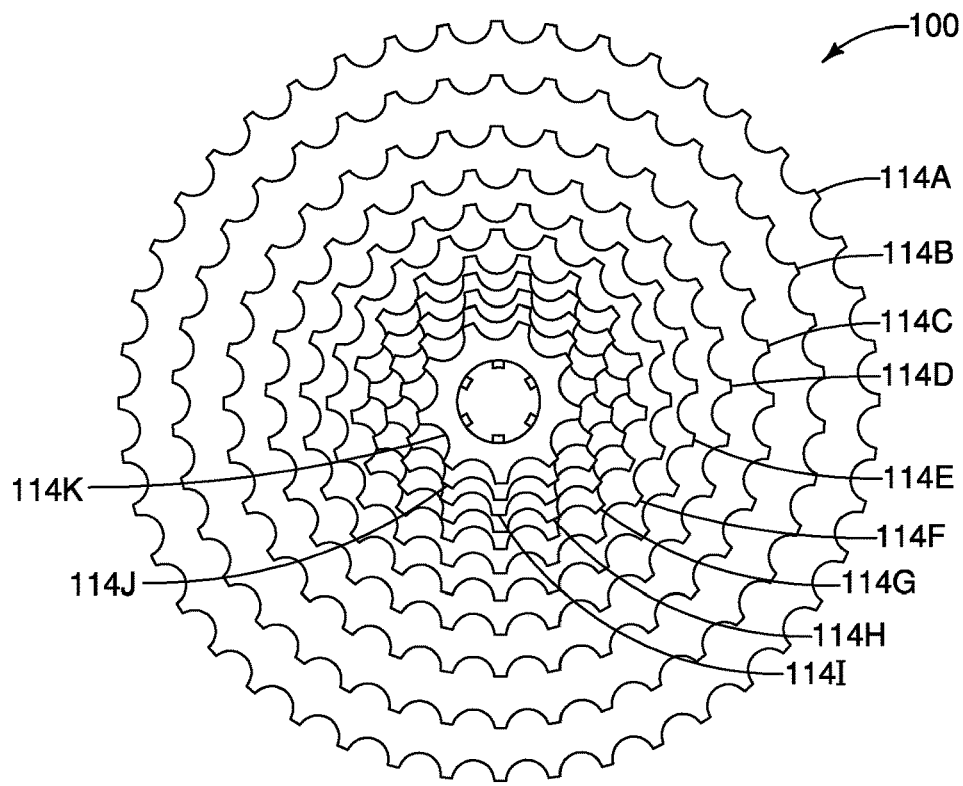
FIG. 9 is an outside elevational view of a first alternate rear sprocket assembly having eleven rear sprockets that can be utilized with the bicycle drive train and the rear derailleur illustrated in FIG. 1.

Referring now to FIG. 9, a first alternate rear sprocket assembly 100 is illustrated that can replace the rear sprockets 14 of FIG. 1. The first alternate rear sprocket assembly 100 is also configured to be mounted on the freewheel (not shown) of the rear hub 24, and is configured to be rotatable about the first sprocket axis R1. The first rear sprocket assembly 100 has eleven rear sprockets 114A to 114K. In other words, the first alternate rear sprocket assembly 114 includes a first sprocket and a second sprocket that are among the eleven rear sprockets 114A to 114K. The eleven rear sprockets 114A to 114K are configured to be arranged on an outer peripheral portion (not shown) of the rear hub 24 in an axial direction parallel to the hub axle 24A. As shown, the first rear sprocket 114A includes forty-four sprocket teeth and the eleventh sprocket 114K includes nine sprocket teeth. In the illustrated embodiment, the first rear sprocket 114A has a first tooth number that is more than or equal to forty-four and eleventh sprocket 114K has a second tooth number that is less than or equal to ten.

Thus, the first alternate rear sprocket assembly 100 has a first sprocket (that is the first rear sprocket 114A) that has a first tooth number that is more than or equal to forty-four, and a second sprocket (that is the eleventh rear sprocket 114K) that has a second tooth number that is less than or equal to ten. The first alternate rear sprocket assembly 100 has a teeth progression of 9-11-13-15-17-20-23-27-32-38-44.

Figure 10:
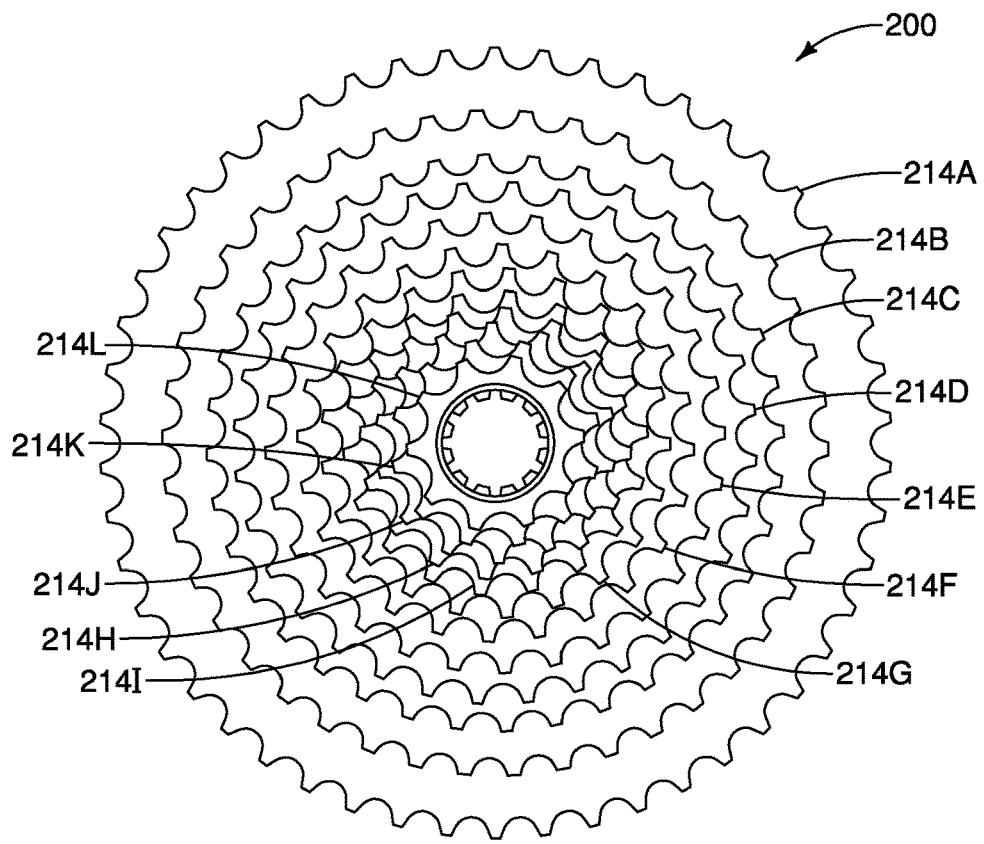
FIG. 10 is an outside elevational view of a second alternate rear sprocket assembly having ten rear sprockets that can be utilized with the bicycle drive train and rear derailleur illustrated in FIG. 1.

Referring now to FIG. 10, a second alternate rear sprocket assembly 200 is illustrated that can be utilized with the rear derailleur 12. The second alternate rear sprocket assembly 200 includes twelve rear sprockets 214A to 214L. The second alternate rear sprocket assembly 200 is configured to be mounted onto a freewheel of the rear hub 24 in a similar manner as the first alternate rear sprocket assembly 100, and will not be further discussed. As shown, the first rear sprocket 214A includes fifty sprocket teeth and the twelfth sprocket 214L includes ten sprocket teeth. As shown, the first rear sprocket 214A includes fifty sprocket teeth and the twelfth sprocket 214L includes ten sprocket teeth. In the illustrated embodiment, the first rear sprocket 214A has a first tooth number that is more than or equal to fifty. Additionally, the twelfth sprocket 214L has a second tooth number that is less than or equal to ten.

Thus, the second alternate rear sprocket assembly 200 has a first sprocket (that is the first rear sprocket 214A) that has a first tooth number is more than or equal to fifty. Additionally, the second alternate rear sprocket assembly 200 has a second sprocket (that is the twelfth sprocket 214L) that has a second tooth number that is less than or equal to ten. The second alternate rear sprocket assembly 200 has a teeth progression of 10-12-14-16-18-21-24-28-32-36-42-50.

Figure 11:
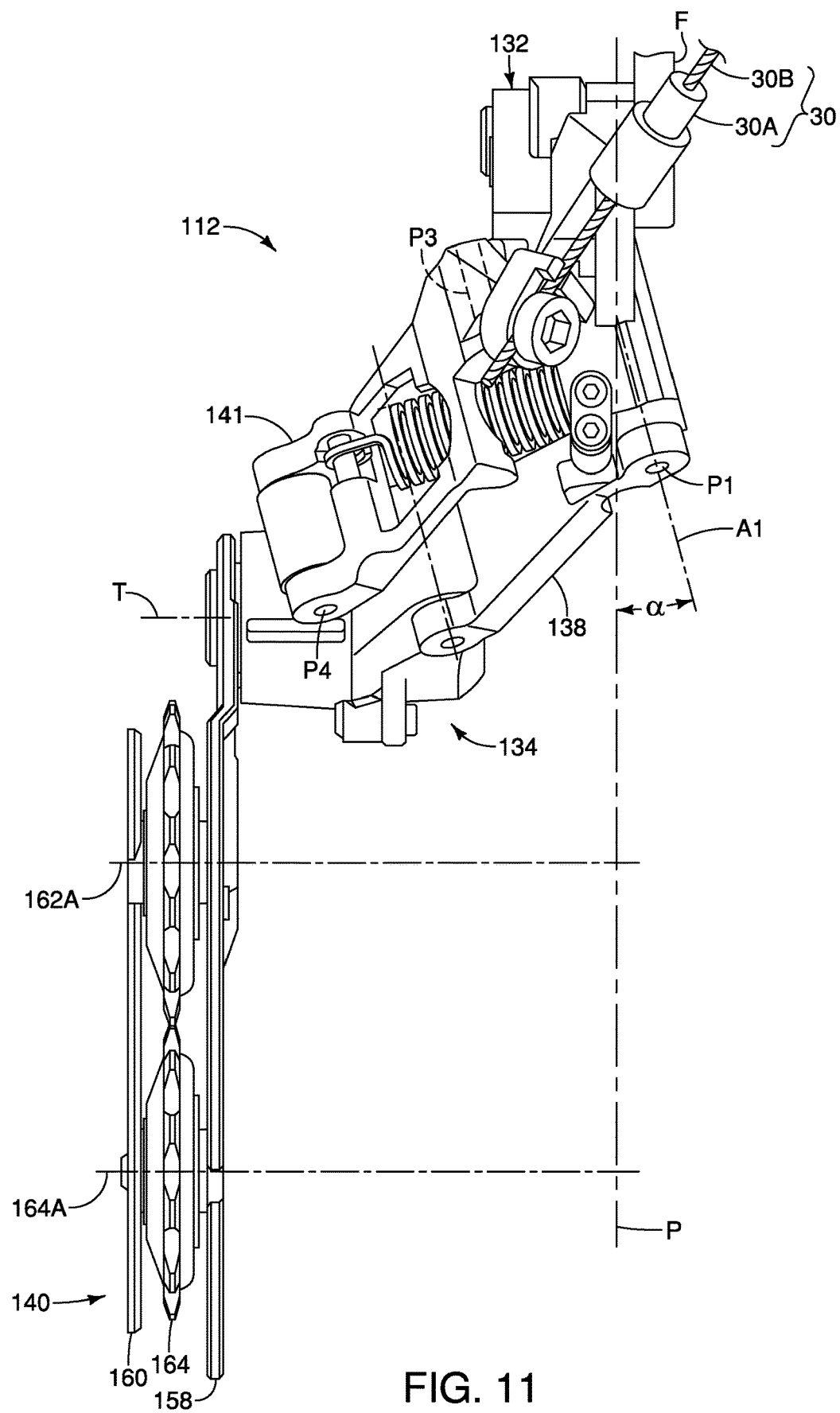
FIG. 11 is a rear elevational view of a rear derailleur in accordance with a second embodiment in which the rear derailleur is in a low position.
Figure 12:
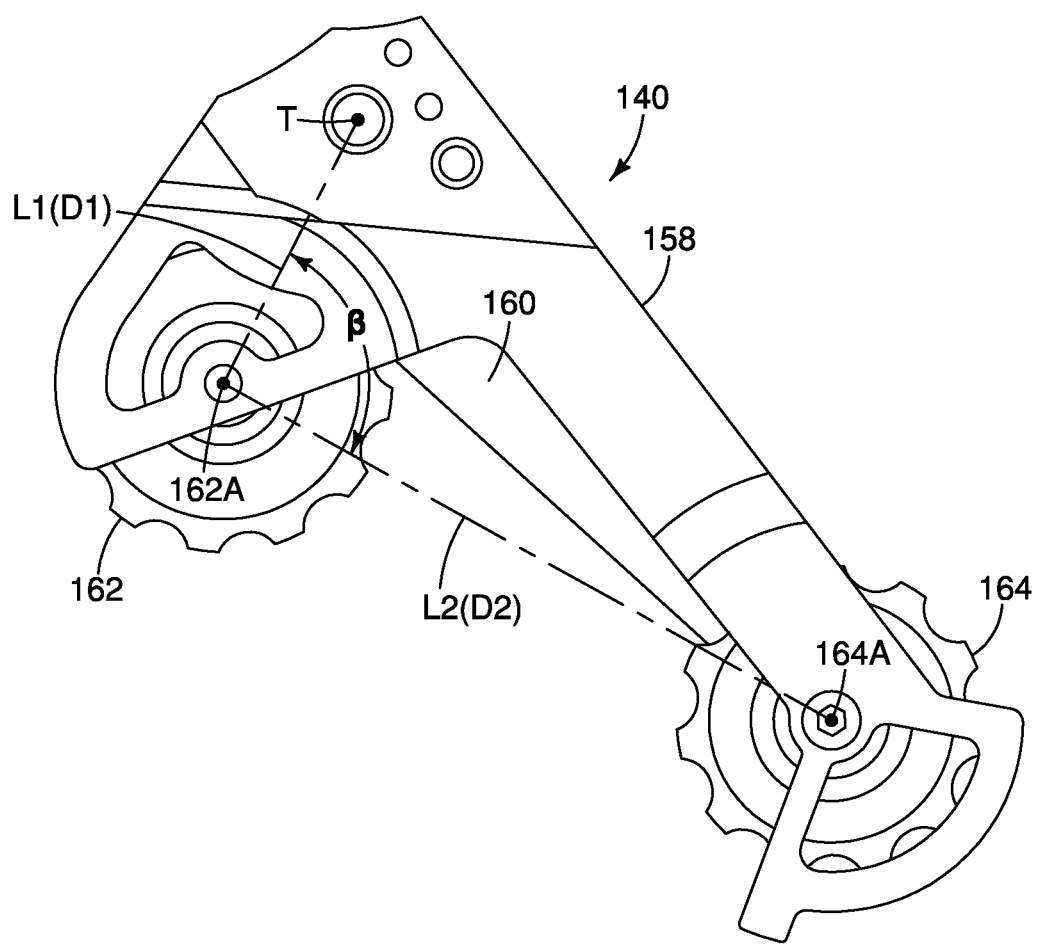
FIG. 12 is an outside elevational view of the chain guide of the rear derailleur illustrated in FIG. 11.

Referring now to FIGS. 11 and 12, a rear derailleur 112 is illustrated in accordance with a second embodiment. The rear derailleur 112 basically comprises a base member 132, a movable member 134, a link member 138, and a chain guide 140. Similar to the first embodiment, preferably, the bicycle rear derailleur 112 further comprises another link member 141. The link member 138 is pivotally attached to the base member 132 by a first pivot pin P1 and to the movable member 134 by a second pivot pin P2. The link member 141 is pivotally attached to the base member 132 by a third pivot pin P3 and to the movable member 134 by a fourth pivot pin P4. Thus, like in the first embodiment, the chain guide 140 moves in a direction perpendicular to a first reference plane P that is perpendicular to the first sprocket axis R1. The first pivot pin P1 defines a first link axis A1. The first link axis A1 and the first reference plane P define a first angle α.

Moreover, like in the first embodiment, the chain guide 140 is pivotally mounted to the movable member 134 about a tension pivot axis T. Also, similar to the first embodiment, the chain guide 140 basically includes a first or outer chain cage plate 158, a second or inner chain cage plate 160, a first or guide pulley 162 and a second or tension pulley 164. The first and second pulleys 162 and 164 are both rotatably disposed between the chain cage plates 158 and 160. The first pulley 162 has a first rotational axis 162A. The second pulley 164 has a second rotational axis 164A. The tension pivot axis T is substantially parallel to the first and second rotational axes 162A and 164A.

As seen in FIG. 12, the first and second pulleys 162 and 164 are mounted to the chain guide 140 to define a first reference line L1 and a second reference line L2. The first reference line L1 and the second reference line L2 define a second angle ß. The first reference line L1 defines a first distance D1 between the tension pivot axis T and the first rotational axis 162A. The second reference line L2 defines a second distance D2 between the first rotational axis 162A and the second rotational axis 164A.

The rear derailleur 112 is basically identical to the rear derailleur 12, which is discussed above, except for the following modifications: (1) the first and second distances D1 and D2 have been changed; (2) the first angle α has been changed; and (3) the second angle ß has been changed. In view of the similarity of the rear derailleurs 12 and 112, only the modifications of the rear derailleur 112 will be discussed and/or illustrated herein.

In the second embodiment, the interconnection of the between the base member 132 and the movable member 134 has been modified so that the angle of the first to fourth pivot pins P1 to P4 are angled differently from the first embodiment. Namely, the first to fourth pivot pins P1 to P4 are angled so that the first angle α is 15° as seen in FIG. 11. In the second embodiment, the locations of the first and second pulleys 162 and 164 between the chain cage plates 158 and 160 has been modified from the locations of the first and second pulleys 62 and 64 in the first embodiment. Specifically, the first and second pulleys 162 and 164 are arranged so that the first distance D1 is 40.5 millimeters, the second distance D2 is 95 millimeters, and the second angle ß is 92° as seen in FIG. 12.

The rear derailleur 112 is especially configured for use with a drive train having a single front sprocket such as the front sprocket 16 and a rear cassette having twelve sprockets with a teeth progression of 10-12-14-16-18-21-24-28-33-39-45-51.

Figure 13:
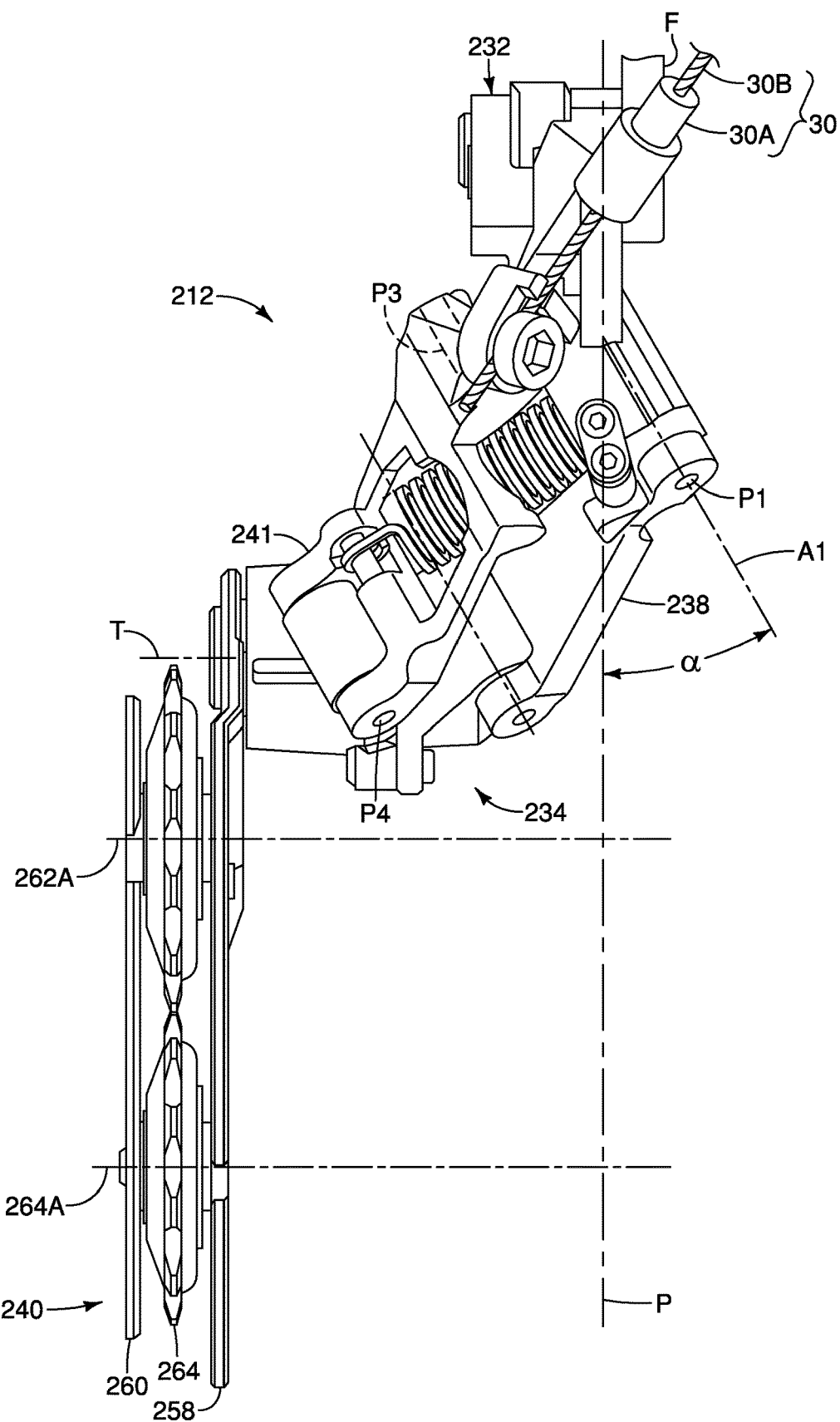
FIG. 13 is a rear elevational view of a rear derailleur in accordance with a third embodiment in which the rear derailleur is in a low position.
Figure 14:
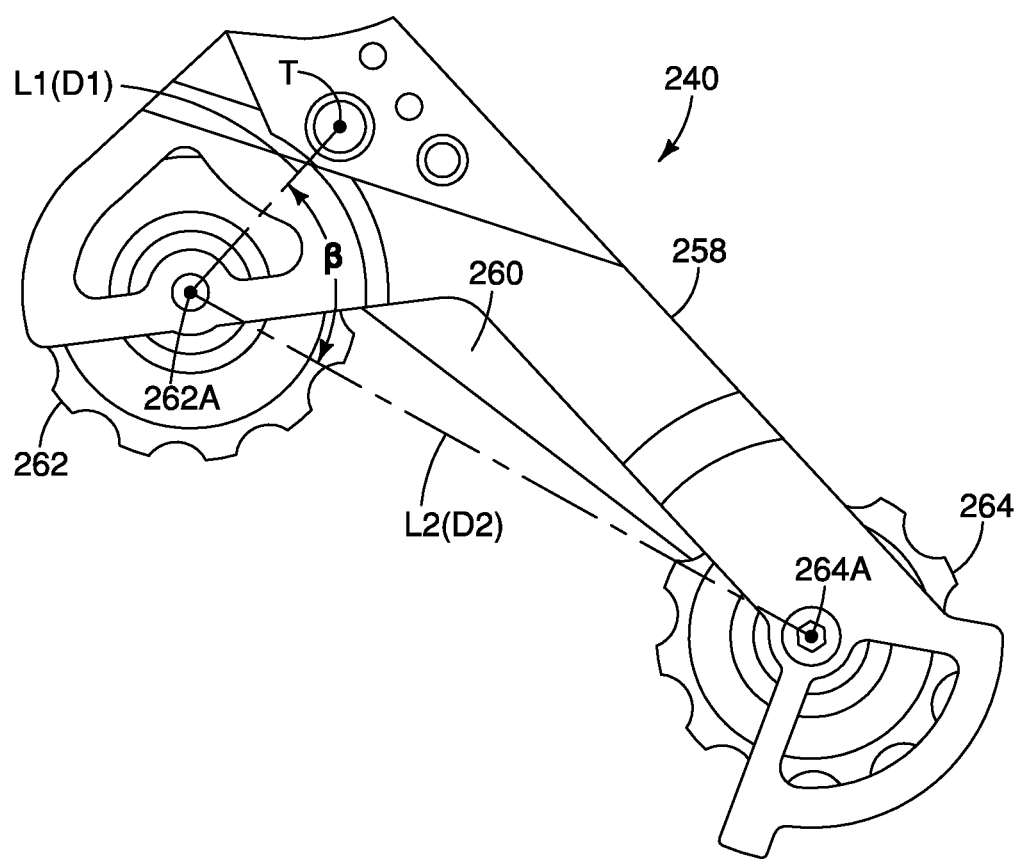
FIG. 14 is an outside elevational view of the chain guide of the rear derailleur illustrated in FIG. 13.

Referring now to FIGS. 13 and 14, a rear derailleur 212 is illustrated in accordance with a third embodiment. The rear derailleur 212 basically comprises a base member 232, a movable member 234, a link member 238, and a chain guide 240. Similar to the first embodiment, preferably, the bicycle rear derailleur 212 further comprises another link member 241. The link member 238 is pivotally attached to the base member 232 by a first pivot pin P1 and to the movable member 234 by a second pivot pin P2. The link member 241 is pivotally attached to the base member 232 by a third pivot pin P3 and to the movable member 234 by a fourth pivot pin P4. Thus, like in the first embodiment, the chain guide 240 moves in a direction perpendicular to a first reference plane P that is perpendicular to the first sprocket axis R1. The first pivot pin P1 defines a first link axis A1. The first link axis A1 and the first reference plane P define a first angle α.

Moreover, like in the first embodiment, the chain guide 240 is pivotally mounted to the movable member 234 about a tension pivot axis T. Also, similar to the first embodiment, the chain guide 240 basically includes a first or outer chain cage plate 258, a second or inner chain cage plate 260, a first or guide pulley 262 and a second or tension pulley 264. The first and second pulleys 262 and 264 are both rotatably disposed between the chain cage plates 258 and 260. The first pulley 262 has a first rotational axis 262A. The second pulley 264 has a second rotational axis 264A. The tension pivot axis T is substantially parallel to the first and second rotational axes 262A and 264A.

As seen in FIG. 14, the first and second pulleys 262 and 264 are mounted to the chain guide 240 to define a first reference line L1 and a second reference line L2. The first reference line L1 and the second reference line L2 define a second angle ß. The first reference line L1 defines a first distance D1 between the tension pivot axis T and the first rotational axis 262A. The second reference line L2 defines a second distance D2 between the first rotational axis 262A and the second rotational axis 264A.

The rear derailleur 212 is basically identical to the rear derailleur 12, which is discussed above, except for the following modifications: (1) the first and second distances D1 and D2 have been changed; (2) the first angle α has been changed; and (3) the second angle ß has been changed. In view of the similarity of the rear derailleurs 12 and 212, only the modifications of the rear derailleur 212 will be discussed and/or illustrated herein.

In the third embodiment, the interconnection of the between the base member 232 and the movable member 234 has been modified so that the angle of the first to fourth pivot pins P1 to P4 are angled differently from the first embodiment. Namely, the first to fourth pivot pins P1 to P4 are angled so that the first angle α is 30° as seen in FIG. 13. In the third embodiment, the locations of the first and second pulleys 262 and 264 between the chain cage plates 258 and 260 has been modified from the locations of the first and second pulleys 62 and 64 in the first embodiment. Specifically, the first and second pulleys 262 and 264 are arranged so that the first distance D1 is 30.5 millimeters, the second distance D2 is 97 millimeters, and the second angle ß is 77° as seen in FIG. 14.

The rear derailleur 212 is especially configured for use with a drive train having a single front sprocket such as the front sprocket 16 and a rear cassette having twelve sprockets with a teeth progression of 10-12-14-16-18-21-24-28-33-39-45-51.

Figure 15:
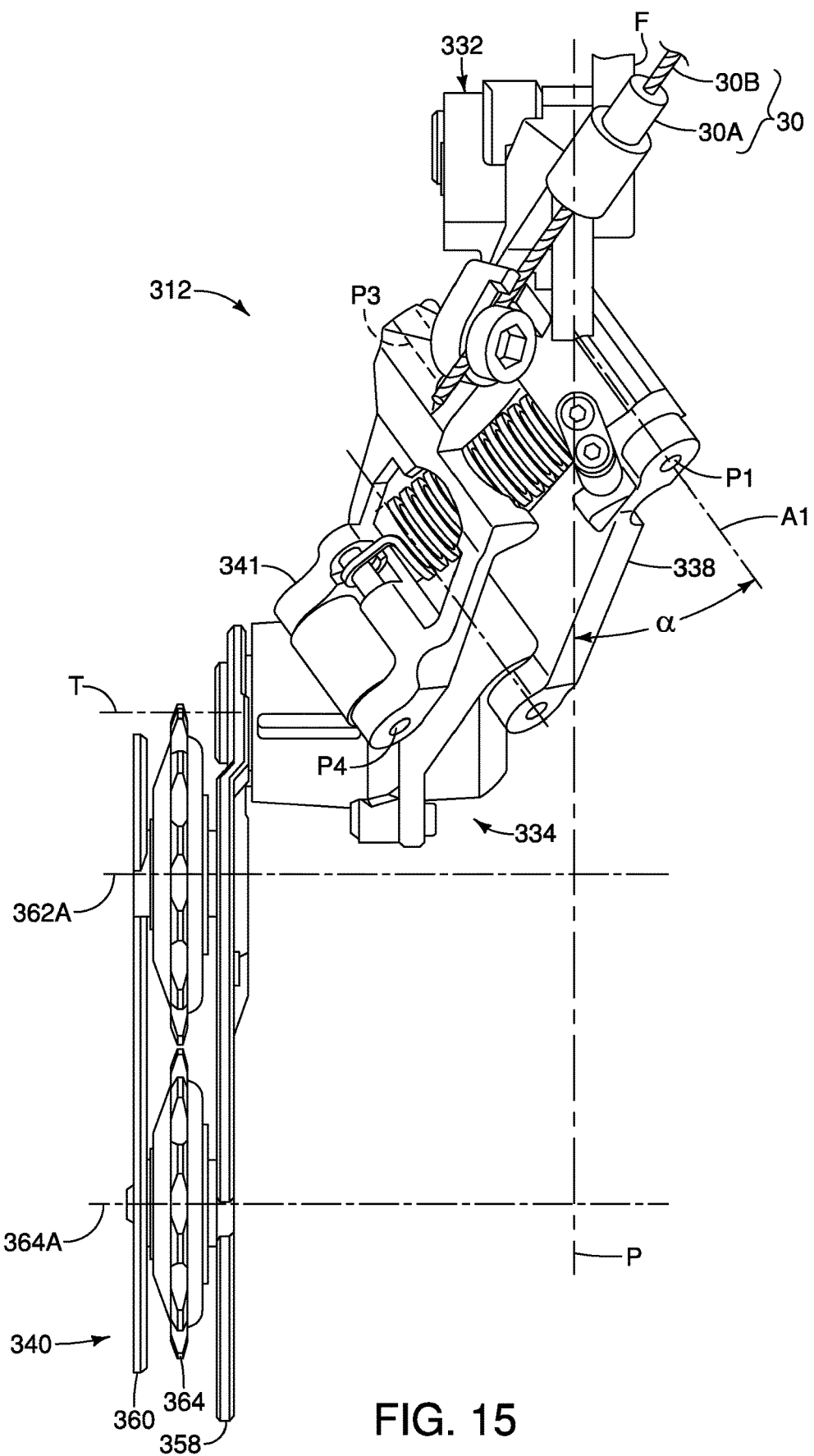
FIG. 15 is a rear elevational view of a rear derailleur in accordance with a fourth embodiment in which the rear derailleur is in a low position.
Figure 16:
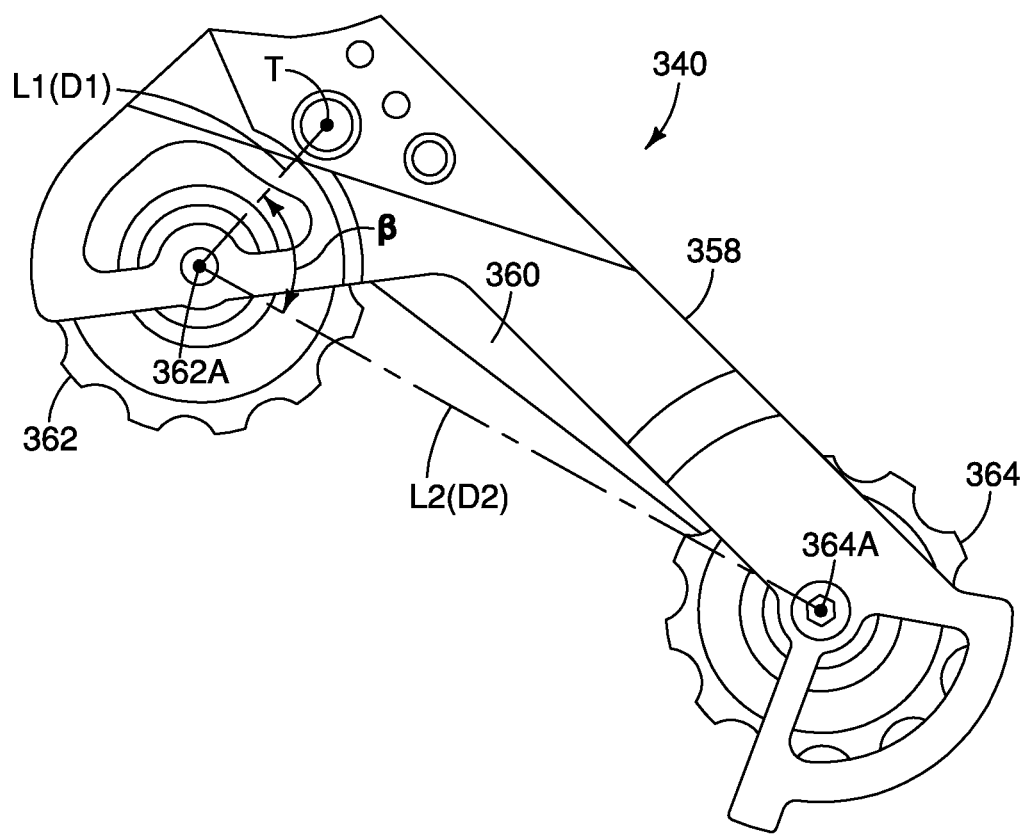
FIG. 16 is an outside elevational view of the chain guide of the rear derailleur illustrated in FIG. 15.

Referring now to FIGS. 15 and 16, a rear derailleur 312 is illustrated in accordance with a fourth embodiment. The rear derailleur 312 basically comprises a base member 332, a movable member 334, a link member 338, and a chain guide 340. Similar to the first embodiment, preferably, the bicycle rear derailleur 312 further comprises another link member 341. The link member 338 is pivotally attached to the base member 332 by a first pivot pin P1 and to the movable member 334 by a second pivot pin P2. The link member 341 is pivotally attached to the base member 332 by a third pivot pin P3 and to the movable member 334 by a fourth pivot pin P4. Thus, like in the first embodiment, the chain guide 340 moves in a direction perpendicular to a first reference plane P that is perpendicular to the first sprocket axis R1. The first pivot pin P1 defines a first link axis A1. The first link axis A1 and the first reference plane P define a first angle α.

Moreover, like in the first embodiment, the chain guide 340 is pivotally mounted to the movable member 334 about a tension pivot axis T. Also, similar to the first embodiment, the chain guide 340 basically includes a first or outer chain cage plate 358, a second or inner chain cage plate 360, a first or guide pulley 362 and a second or tension pulley 364. The first and second pulleys 362 and 364 are both rotatably disposed between the chain cage plates 358 and 360. The first pulley 362 has a first rotational axis 362A. The second pulley 364 has a second rotational axis 364A. The tension pivot axis T is substantially parallel to the first and second rotational axes 362A and 364A.

As seen in FIG. 16, the first and second pulleys 362 and 364 are mounted to the chain guide 340 to define a first reference line L1 and a second reference line L2. The first reference line L1 and the second reference line L2 define a second angle ß. The first reference line L1 defines a first distance D1 between the tension pivot axis T and the first rotational axis 362A. The second reference line L2 defines a second distance D2 between the first rotational axis 362A and the second rotational axis 364A.

The rear derailleur 312 is basically identical to the rear derailleur 12, which is discussed above, except for the following modifications: (1) the first and second distances D1 and D2 have been changed; (2) the first angle α has been changed; and (3) the second angle ß has been changed. In view of the similarity of the rear derailleurs 12 and 312, only the modifications of the rear derailleur 312 will be discussed and/or illustrated herein.

In the fourth embodiment, the interconnection of the between the base member 332 and the movable member 334 has been modified so that the angle of the first to fourth pivot pins P1 to P4 are angled differently from the first embodiment. Namely, the first to fourth pivot pins P1 to P4 are angled so that the first angle α is 36° as seen in FIG. 15. In the fourth embodiment, the locations of the first and second pulleys 362 and 364 between the chain cage plates 358 and 360 has been modified from the locations of the first and second pulleys 62 and 64 in the first embodiment. Specifically, the first and second pulleys 362 and 364 are arranged so that the first distance D1 is 30.5 millimeters, the second distance D2 is 97 millimeters, and the second angle ß is 77° as seen in FIG. 16.

The rear derailleur 312 is especially configured for use with a drive train having two front sprockets and a rear cassette having twelve sprockets with a teeth progression of 10-12-14-16-18-21-24-28-32-36-40-45. Regarding the two front sprockets, a difference of the total tooth numbers between the two front sprockets can be equal to or more than ten when using the rear derailleur 312.

Figure 17:
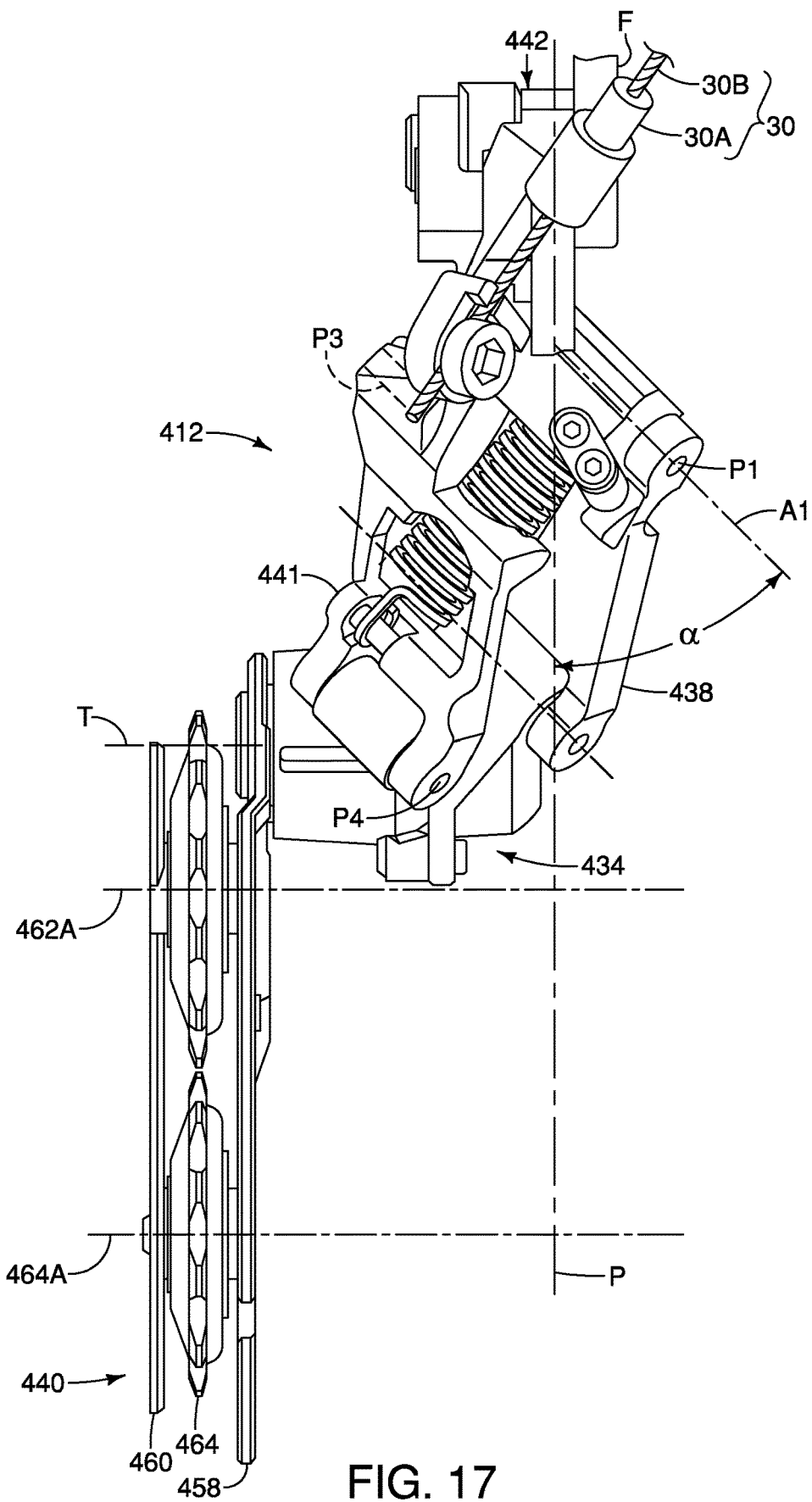
FIG. 17 is a rear elevational view of a rear derailleur in accordance with a fifth embodiment in which the rear derailleur is in a low position.
Figure 18:
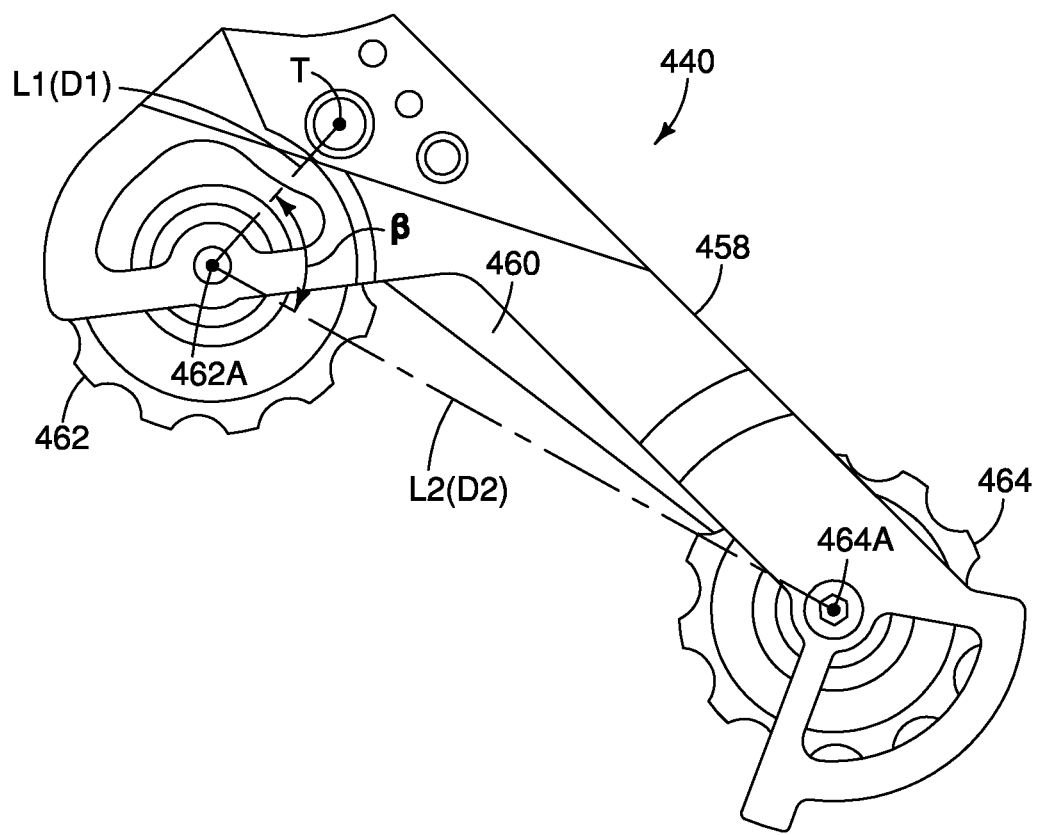
FIG. 18 is an outside elevational view of the chain guide of the rear derailleur illustrated in FIG. 17.

Referring now to FIGS. 17 and 18, a rear derailleur 412 is illustrated in accordance with a fifth embodiment. The rear derailleur 412 basically comprises a base member 432, a movable member 434, a link member 438, and a chain guide 440. Similar to the first embodiment, preferably, the bicycle rear derailleur 412 further comprises another link member 441. The link member 438 is pivotally attached to the base member 432 by a first pivot pin P1 and to the movable member 434 by a second pivot pin P2. The link member 441 is pivotally attached to the base member 432 by a third pivot pin P3 and to the movable member 434 by a fourth pivot pin P4. Thus, like in the first embodiment, the chain guide 440 moves in a direction perpendicular to a first reference plane P that is perpendicular to the first sprocket axis R1. The first pivot pin P1 defines a first link axis A1. The first link axis A1 and the first reference plane P define a first angle α.

Moreover, like in the first embodiment, the chain guide 440 is pivotally mounted to the movable member 434 about a tension pivot axis T. Also, similar to the first embodiment, the chain guide 440 basically includes a first or outer chain cage plate 458, a second or inner chain cage plate 460, a first or guide pulley 462 and a second or tension pulley 464. The first and second pulleys 462 and 464 are both rotatably disposed between the chain cage plates 458 and 460. The first pulley 462 has a first rotational axis 462A. The second pulley 464 has a second rotational axis 464A. The tension pivot axis T is substantially parallel to the first and second rotational axes 462A and 464A.

As seen in FIG. 18, the first and second pulleys 462 and 464 are mounted to the chain guide 440 to define a first reference line L1 and a second reference line L2. The first reference line L1 and the second reference line L2 define a second angle ß. The first reference line L1 defines a first distance D1 between the tension pivot axis T and the first rotational axis 462A. The second reference line L2 defines a second distance D2 between the first rotational axis 462A and the second rotational axis 464A.

The rear derailleur 412 is basically identical to the rear derailleur 12, which is discussed above, except for the following modifications: (1) the first and second distances D1 and D2 have been changed; (2) the first angle α has been changed; and (3) the second angle ß has been changed. In view of the similarity of the rear derailleurs 12 and 412, only the modifications of the rear derailleur 412 will be discussed and/or illustrated herein.

In the fifth embodiment, the interconnection of the between the base member 432 and the movable member 434 has been modified so that the angle of the first to fourth pivot pins P1 to P4 are angled differently from the first embodiment. Namely, the first to fourth pivot pins P1 to P4 are angled so that the first angle α is 45° as seen in FIG. 17. In the fifth embodiment, the locations of the first and second pulleys 462 and 464 between the chain cage plates 458 and 460 has been modified from the locations of the first and second pulleys 62 and 64 in the first embodiment. Specifically, the first and second pulleys 462 and 464 are arranged so that the first distance D1 is 26 millimeters, the second distance D2 is 97 millimeters, and the second angle ß is 77° as seen in FIG. 18.

The rear derailleur 412 is especially configured for use with a drive train having two front sprockets and a rear cassette having twelve sprockets with a teeth progression of 10-12-14-16-18-21-24-28-32-36-40-45. Regarding the two front sprockets, a difference of the total tooth numbers between the two front sprockets can be equal to or more than ten when using the rear derailleur 412.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "axial", "non-frame facing side", "forward", "rearward", "front", "rear", "up", "down", "above", "below", "upward", "downward", "top", "bottom", "side", "vertical", "parallel", "perpendicular" and "transverse" as well as any other similar directional terms refer to those directions of a bicycle in an upright, riding position and equipped with the bicycle drive train and the rear derailleur. Accordingly, these directional terms, as utilized to describe the rear derailleur should be interpreted relative to a bicycle in an upright riding position on a horizontal surface and that is equipped with the bicycle drive train having the rear derailleur.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rear derailleur comprising:
   a base member configured to be mounted to a bicycle frame;
   a movable member movable between a top shift stage position and a low shift stage position;
   a link member pivotally connected to the base member about a first link axis and pivotally connected to the movable member about a second link axis that is substantially parallel to the first link axis, the first link axis being a pivot axis about which the link member pivots when the movable member moves between the top shift stage position and the low shift stage position, the link member includes an outer link member and an inner link member, the outer link member has the first link axis and the second link axis, a majority portion of the outer link member moving across different lateral sides of the bicycle frame about the first link axis when moving between the top and low shift stage positions; and
   a chain guide pivotally mounted to the movable member about a tension pivot axis, the chain guide including a first pulley having a first rotational axis and a second pulley having a second rotational axis, the first pulley being positioned closer to a rear sprocket assembly than the second pulley in a state where the bicycle rear derailleur is mounted to the bicycle, the tension pivot axis being substantially parallel to the first and second rotational axes,
   a first reference line defining a first distance between the tension pivot axis and the first rotational axis, the first distance being 2 mm to 70 mm, a second reference line defining a second distance between the first rotational axis and the second rotational axis,
   the first link axis and a reference plane defining a first angle ranging from 3 degrees to 35 degrees, the reference plane being perpendicular to the sprocket axis,
   the first reference line and the second reference line defining a second angle ranging from 20 degrees to 170 degrees.

2. The bicycle rear derailleur according to claim 1, wherein the first angle ranges from 5 degrees to 30 degrees.

3. The bicycle derailleur according to claim 1, wherein the first distance ranges from 15 mm to 60 mm.

4. The bicycle derailleur according to claim 1, wherein the second angle ranges from 40 degrees to 120 degrees.

5. The bicycle derailleur according to claim 1, wherein the first angle ranges from 5 degrees to 25 degrees.

6. The bicycle derailleur according to claim 1, wherein the first distance ranges from 25 mm to 50 mm.

7. The bicycle derailleur according to claim 1, wherein the second angle ranges from 60 degrees to 100 degrees.

8. A bicycle drive train including the bicycle rear derailleur according to claim 1, the bicycle drive train further comprising
   at least one front sprocket,
   at least one rear sprocket, and
   a bicycle chain selectively engaged with the at least one front sprocket and the at least one rear sprocket.

9. The bicycle drive train according to claim 8, wherein the at least one front sprocket includes
   a sprocket body, and
   a plurality of sprocket teeth extending radially outwardly from an outer periphery of the sprocket body, the plurality of sprocket teeth including at least one first tooth and at least one second tooth, the at least one first tooth having a first maximum chain-engaging width, the at least one second tooth having a second maximum chain-engaging width that is smaller than the first maximum chain-engaging width.

10. The bicycle drive train according to claim 9, wherein the first maximum chain-engaging width is larger than an inner link space defined between an opposed pair of inner link plates of a bicycle chain in an axial direction parallel to a rotational center axis of the bicycle sprocket and smaller than an outer link space defined between an opposed pair of outer link plates of the bicycle chain in the axial direction, and
   the second maximum chain-engaging width is smaller than the inner link space.

11. The bicycle drive train according to claim 8, wherein the at least one rear sprocket includes
   a first sprocket having a first tooth number that is more than or equal to forty-four, and
   a second sprocket having a second tooth number that is less than or equal to ten.

12. The bicycle drive train according to claim 11, wherein the first tooth number is more than or equal to fifty.

13. The bicycle drive train according to claim 11, wherein the at least one front sprocket consists of a solitary front sprocket.

14. A bicycle rear derailleur comprising:
a base member configured to be mounted to a bicycle;
a movable member movable between a top shift stage position and a low shift stage position;
a link member pivotally connected to the base member about a first link axis and pivotally connected to the movable member about a second link axis that is substantially parallel to the first link axis, the first link axis being a pivot axis about which the link member pivots when the movable member moves between the top shift stage position and the low shift stage position, the link member including an outer link and an inner link, the outer link having the first link axis and the second link axis, a majority portion of the outer link moving across different lateral sides of the bicycle frame about the first link axis when moving between the top and low shift stage positions; and
a chain guide pivotally mounted to the movable member about a tension pivot axis, the chain guide including a first pulley having a first rotational axis and a second pulley having a second rotational axis, the first pulley being positioned closer to a rear sprocket assembly than the second pulley in a state where the bicycle rear derailleur is mounted to the bicycle, the tension pivot axis being substantially parallel to the first and second rotational axes,
a first reference line defining a first distance between the tension pivot axis and the first rotational axis, the first distance being 20 mm to 70 mm, a second reference line defining a second distance between the first rotational axis and the second rotational axis,
the first link axis and a first reference plane defining a first angle ranging from 3 degrees to 60 degrees, the first reference plane being perpendicular to the sprocket axis,
the first reference line and the second reference line defining a second angle ranging from 20 degrees to 170 degrees.

15. The bicycle rear derailleur according to claim 14, wherein
the first angle ranges from 5 degrees to 30 degrees.

16. The bicycle derailleur according to claim 14, wherein the first distance ranges from 20 mm to 60 mm.

17. The bicycle derailleur according to claim 14, wherein the second angle ranges from 40 degrees to 120 degrees.

18. The bicycle derailleur according to claim 14, wherein the first angle ranges from 5 degrees to 25 degrees.

19. The bicycle derailleur according to claim 14, wherein the first distance ranges from 25 mm to 50 mm.

20. The bicycle derailleur according to claim 14, wherein the second angle ranges from 60 degrees to 100 degrees.

21. A bicycle drive train including the bicycle rear derailleur according to claim 14, the bicycle drive train further comprising
at least one front sprocket,
at least one rear sprocket, and
a bicycle chain selectively engaged with the at least one front sprocket and the at least one rear sprocket.

22. The bicycle drive train according to claim 21, wherein the at least one front sprocket includes
a sprocket body, and
a plurality of sprocket teeth extending radially outwardly from an outer periphery of the sprocket body, the plurality of sprocket teeth including at least one first tooth and at least one second tooth, the at least one first tooth having a first maximum chain-engaging width, the at least one second tooth having a second maximum chain-engaging width that is smaller than the first maximum chain-engaging width.

23. The bicycle drive train according to claim 22, wherein
the first maximum chain-engaging width is larger than an inner link space defined between an opposed pair of inner link plates of a bicycle chain in an axial direction parallel to a rotational center axis of the bicycle sprocket and smaller than an outer link space defined between an opposed pair of outer link plates of the bicycle chain in the axial direction, and
the second maximum chain-engaging width is smaller than the inner link space.

24. The bicycle drive train according to claim 21, wherein the at least one rear sprocket includes
a first sprocket having a first tooth number that is more than or equal to forty-four, and
a second sprocket having a second tooth number that is less than or equal to ten.

25. The bicycle drive train according to claim 24, wherein the first tooth number is more than or equal to fifty.

26. The bicycle drive train according to claim 24, wherein the at least one front sprocket consists of a solitary front sprocket.

* * * * *